United States Patent
Smith et al.

(10) Patent No.: US 11,968,056 B2
(45) Date of Patent: Apr. 23, 2024

(54) AVATAR SPATIAL MODES

(71) Applicant: Apple Inc., Cupertino, CA (US)

(72) Inventors: Connor A. Smith, San Mateo, CA (US); Bruno M. Sommer, Sunnyvale, CA (US); Jonathan R. Dascola, San Francisco, CA (US); Nicholas W. Henderson, San Carlos, CA (US); Timofey Grechkin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,017

(22) Filed: Mar. 23, 2023

(65) Prior Publication Data
US 2023/0299989 A1     Sep. 21, 2023

Related U.S. Application Data

(63) Continuation of application No. PCT/US2021/051311, filed on Sep. 21, 2021.
(Continued)

(51) Int. Cl.
*H04L 12/18*     (2006.01)
*G06T 13/20*     (2011.01)

(52) U.S. Cl.
CPC .......... *H04L 12/1818* (2013.01); *G06T 13/20* (2013.01); *H04L 12/1822* (2013.01)

(58) Field of Classification Search
CPC . H04L 12/1818; H04L 12/1822; G06T 13/20; H04N 7/157; G06F 3/011;
(Continued)

(56) References Cited

U.S. PATENT DOCUMENTS

| 11,546,437 B1 * | 1/2023 | Bhushan ............... G06T 19/003 |
| 2020/0210127 A1 | 7/2020 | Browy |

(Continued)

FOREIGN PATENT DOCUMENTS

| WO | 2016077180 A1 | 5/2016 |
| WO | 2018005235 A1 | 1/2018 |

OTHER PUBLICATIONS

Kim, et al., "Redirected head gaze to support AR meetings distributed over heterogeneous environments," 2016 IEEE Virtual Reality (VR), Mar. 19, 2016 (Mar. 19, 2016), XP032919340.
(Continued)

*Primary Examiner* — El Hadji M Sall
(74) *Attorney, Agent, or Firm* — Blank Rome LLP

(57) ABSTRACT

Avatars may be displayed in a multiuser communication session using various spatial modes. One technique for presenting avatars includes presenting avatars such that an attention direction of the avatar is retargeted to match the intent of the remote user corresponding to the avatar. Another technique for presenting avatars includes a pinned mode in which a spatial relationship between one or more avatars remains displayed in a consistent spatial relationship to a local user regardless of movements of the local user. Another technique for presenting avatars includes providing user-selectable presentation modes between a room scale mode and a stationary mode for presenting a representation of a multiuser communication session.

20 Claims, 16 Drawing Sheets

Related U.S. Application Data

(60) Provisional application No. 63/237,635, filed on Aug. 27, 2021, provisional application No. 63/082,685, filed on Sep. 24, 2020.

(58) Field of Classification Search
CPC ............. G06F 3/013; A63F 2300/5553; A63F 2300/8082; A63F 13/358; A63F 13/65; H04M 2203/1025; H04M 2203/359; H04M 3/567
See application file for complete search history.

(56) References Cited

U.S. PATENT DOCUMENTS

| | | | |
|---|---|---|---|
| 2021/0368136 A1* | 11/2021 | Chalmers | H04N 7/157 |
| 2022/0094724 A1* | 3/2022 | Stahl | H04N 7/155 |
| 2023/0388453 A1* | 11/2023 | Chalmers et al. | G06T 19/006 |

OTHER PUBLICATIONS

Piumsomboon, et al., "Mini-Me: An Adaptive Avatar for Mixed Reality Remote Collaboration, " Proceedings of the 2017 ACM on Conference on Information and Knowledge Management, ACMPUB27, Apr. 19, 2018 (Apr. 19, 1028), XP058542383.

Piumsomboon, et al., "On the Shoulder of the Giant: A Multi-Scale Mixed Reality Collaboration with 360 Video Sharing and Tangible Interaction," Proceedings of the 25th ACM SIGKDD International Conference on Knowledge Discovery & Data Mining, KDD '19, May 2, 2019 (May 2, 2019), XP058635597.

\* cited by examiner

AVATAR SPATIAL MODES

BACKGROUND

This disclosure relates generally to extended reality ("XR") presentation. More particularly, but not by way of limitation, this disclosure relates to techniques and systems for providing enhanced representations of a multiuser communication session.

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the XR environment. However, when an XR environment is initiated, what is needed is an improved technique for providing usable representations in the XR environment.

DETAILED DESCRIPTION

Figure 1:
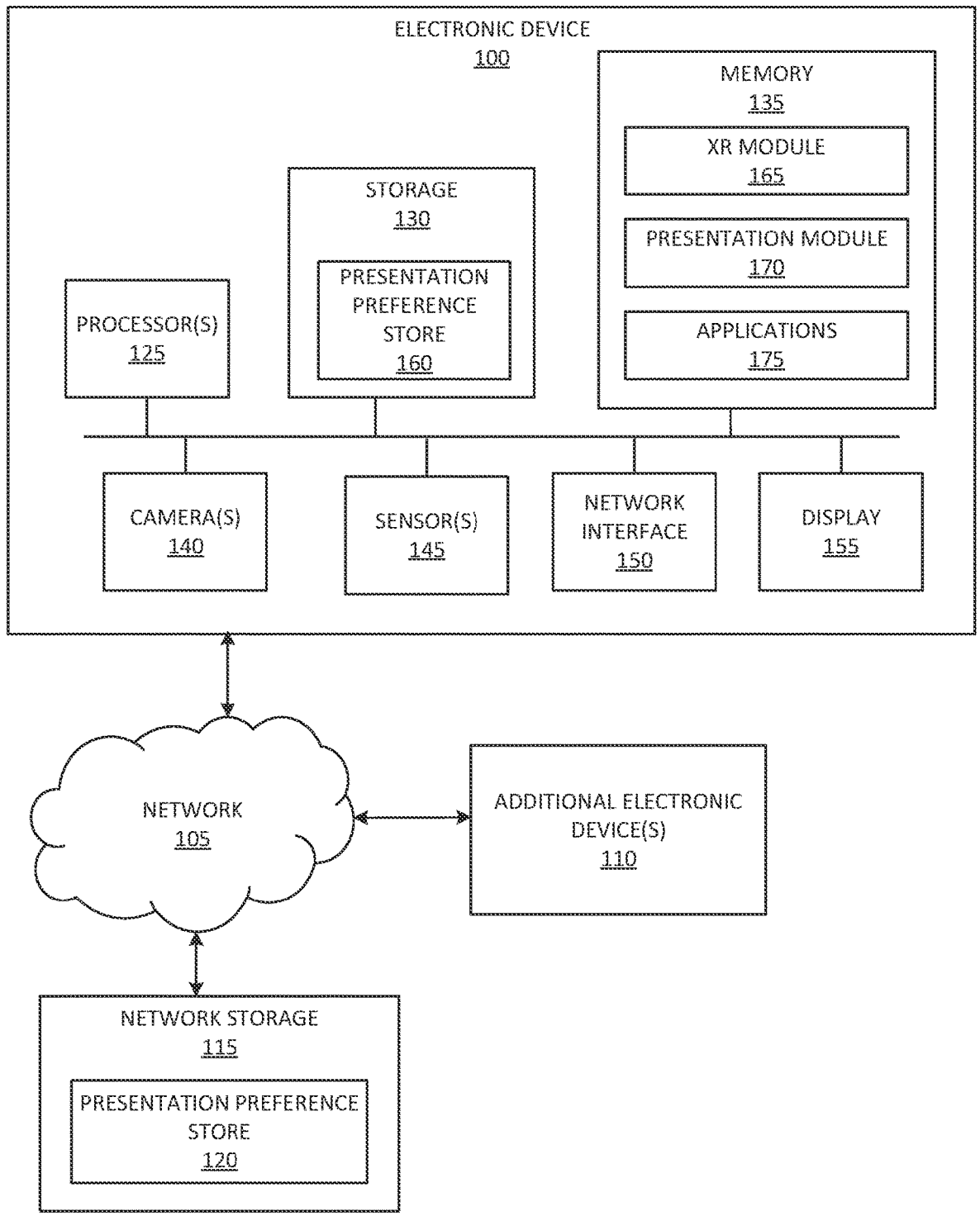
FIG. 1 shows, in block diagram form, exemplary systems for use in various extended reality technologies according to one or more embodiments.

This disclosure pertains to systems, methods, and computer-readable media to provide representations of multiuser communication sessions, for example in an extended reality environment. In one or more embodiments, two or more users may be active within a multiuser communication session from different devices. Two or more users may be active within a multiuser communication session in a manner such that components within the corresponding representations of multiuser communication session (e.g., as displayed by each device) are not presented to the users in a consistent manner. For example, at a local device, a spatial relationship between a remote user and a virtual object in the local view may differ from a spatial relationship between the remote user and the virtual object in a remote view. In one or more embodiments, an attention direction of the remote user may be determined and retargeted such that the movements or cues performed by the remote user are presented in the local representation in a consistent manner in relation to a component of the multiuser communication session to which the remote user is directing attention.

In one or more embodiments, a local user may select a display mode in which the representations of other users active in the multiuser communication session are presented in a manner determined by a local user. For example, while the remote users may be moving around their respective physical environments, a local user may select to present the virtual representation of the remote users in a predetermined spatial relationship to the local user. In some embodiments, the representations of the users may remain consistent in relation to the local user, but may change in pose, orientation, or gesture. As an example, a representation of a face of a particular user may change orientation while the relative location of the particular user to the local user remains constant even as the local user moves around a local physical environment.

In one or more embodiments, a user may select from multiple display preferences. In a room scale mode, a user may view a representation of a multiuser communication session in a manner that is consistent with the representation of the multiuser communication session presented by remote devices also in a room scale mode. In a stationary mode, components of the multiuser communication session are presented in a mode that is usable for a local user from a stationary location. According to one or more embodiments, a room scale mode may present representations of remote users experiencing the multiuser communication session in a stationary mode as stationary representation, such as a tile. The stationary representation of the remote user may be presented in a consistent location to users that view the representation of the multiuser communication session in a room scale manner.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include a communication session in which two or more devices are participating in an XR environment.

For purposes of this disclosure, a local multiuser communication device refers to a current device being described, or being controlled by a user being described, in a multiuser communication session.

For purposes of this disclosure, colocated multiuser communication devices refer to two devices that share a physical environment and an XR environment, such that the users of the colocated devices may experience the same physical objects and ER objects.

For purposes of this disclosure, a remote multiuser communication device refers to a secondary device that is located in a separate physical environment from a current, local multiuser communication device. In one or more embodiments, the remote multiuser communication device may be a participant in the multiuser communication session.

For purposes of this disclosure, shared virtual elements refer to XR objects, such as virtual objects, that are visible or otherwise able to be experienced by participants in a common XR session.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to participate in a multiuser communication session in an ER environment. It should be understood that the various components and functionality within electronic device 100, additional electronic device 110 and network storage 115 may be differently distributed across the devices, or may be distributed across additional devices.

Electronic Device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer-readable storage media capable of storing computer-readable code. Memory 135 may store various programming modules for execution by processor(s) 125, including XR module 165, presentation module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store presentation preference data 160, according to one or more embodiments. Electronic device 100 may additionally include network interface 150, from which additional network components may be accessed via network 105.

Electronic device 100 may also include one or more cameras 140 and/or other sensors 145, such as depth sensor, from which depth or other characteristics of an environment may be determined. In one or more embodiments, each of the one or more cameras 140 may be a traditional RGB camera, or a depth camera. Further, cameras 140 may include a stereo camera- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. Display device 155 may be utilized to present a representation of a multiuser communication session, including shared virtual elements within the multiuser communication session and other shared virtual objects.

Storage 130 may be utilized to store various data and structures which may be utilized for managing presentation preferences for the multiuser communication session. Storage 130 may include, for example, presentation preference store 160. Presentation preference store 160 may store user preference information for presenting components in a multiuser communication session. In accordance with one or more embodiments, the presentation preference store 160 may store display preference information from which a session may be presented upon initialization.

According to one or more embodiments, memory 135 may include one or more modules that comprise computer-readable code executable by the processor(s) 125 to perform functions. The memory may include, for example an XR module 165 which may be used to provide a multiuser communication session in an XR environment. The multiuser communication session XR environment may be a computing environment which supports a shared experience by electronic device 100 as well as additional electronic devices 110 within a multiuser communication session.

Presentation module 170 may manage presentation of a representation of a multiuser communication session, and provide multiple display preferences for presenting a multiuser communication session. A representation of a multiuser communication session may include visual representations of various components of the session. As an example, the representation of the multiuser communication session may include visual representations of applications, representations of other users in the session, representations of shared virtual objects, and the like.

According to some embodiments, the presentation module 170 may manage the representation of a multiuser communication session. In one or more embodiments, the presentation module 170 may provide a room scale version of the representation. In room scale, some or all of the components of the session are presented in a configuration that is consistent with the presentation of the session as it is displayed to other users active in the session who are also viewing the multiuser communication session in room scale mode. For example, a spatial relationship between a local user and a component of the session in a local representation of the multiuser communication session will be consistent with a representation of the local user and the representation of the virtual object in a remote representation of the multiuser communication session presented to a remote user, thus providing "spatial truth" among users. In some embodiments, the presentation module 170 may modify presentation of the representation of the multiuser communication session for one or more users such that the components of the session are not presented in a consistent configuration. That is, "spatial truth" across devices may be lost. Accordingly, when a local representation of the multiuser communication session is inconsistent with a remote representation of the multiuser communication session, a remote user's movement may lack context. For example, because the spatial relationship between the remote user and the virtual object in the remote user's view does not match the spatial relationship between the representation of the remote user and the virtual object in the local user's view, an interaction between the remote user and the virtual object may not be apparent in the local view.

In some embodiments, the presentation module 170 may track local spatial relationships involved in interactions to allow other devices to retarget the actions of the actor to maintain context of the movements. Interactions may include, for example, a gaze direction toward a component, a gesture toward component, manipulation of a component, and the like. As an example, if a local user directs attention to a particular component, the presentation module 170 may track the interaction and transmit an indication of the interaction to other users active in the session such that the presentation of the representation of the remote user can be retargeted to reflect the interaction.

In some embodiments, the presentation module 170 may provide a capability for a user to modify the presentation of representations of remote users in a multiuser communication session. In one or more embodiments, the local user may select a configuration for representations of the remote users such that a spatial relationship between the local users and representations of one or more remote users remains consistent as the user moves around within the multiuser communication session. In one or more embodiments, the presentation module 170 may provide preconfigured layouts in which the representations of the remote users may be displayed. Additionally, or alternatively, the presentation module 170 may provide an interface for the local user to manipulate the presentation of the representations of one or more remote users to set an ongoing spatial relationship between the local user and the representation of the remote user in the multiuser communication session.

According to some embodiments, the presentation module 170 may provide an interface for a local user to select among different presentation modes, such as a stationary mode or a room scale mode. For example, presentation module 170 may provide a stationary mode and a room scale mode. A stationary mode may include a representation of the multiuser communication session in which some or all of the components of the session are presented in a configuration to be accessible to a local user without necessitating that the user move around a physical environment, such as within reach, or with components displayed within a predetermined area around the user. According to one or more embodiments, the stationary mode may present the components of the multiuser communication session without regard to presentation of the components to other users in the session. In some embodiments, interactions between a local user and the components of the session may or may not be shared with other users active in the session.

A room scale mode may include a representation of the multiuser communication session in which some or all of the components of the session are presented in a configuration that is consistent with the presentation of the session as it is displayed to other users active in the session who are also viewing the multiuser communication session in room scale mode. For example, a spatial relationship between a local user and a component of the session in a local representation of the multiuser communication session will be consistent with a representation of the local user and the representation of the virtual object in a remote representation of the multiuser communication session presented to a remote user.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, or some combination of the functionality of any of the components may be combined.

Figure 2:
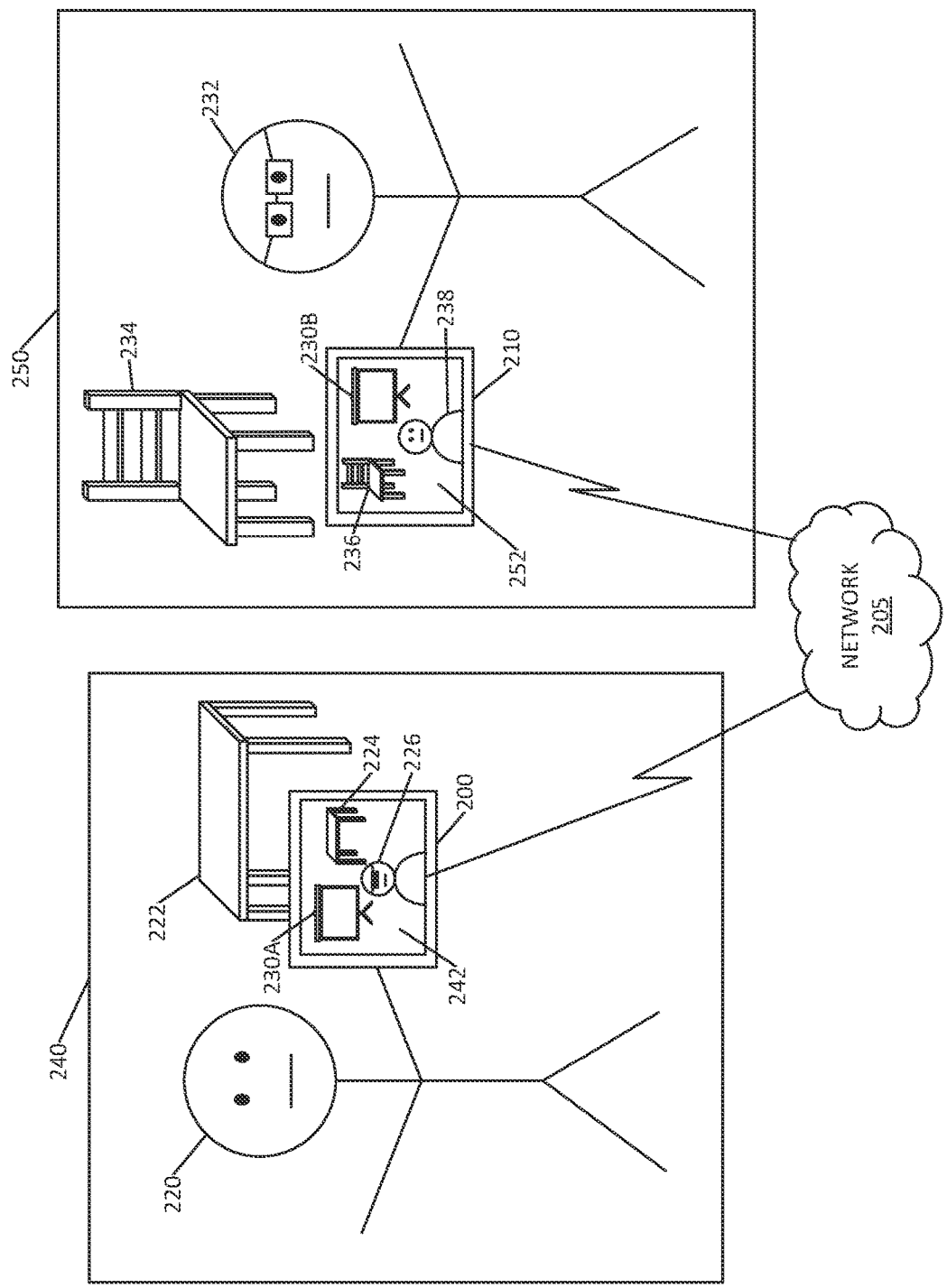
FIG. 2 shows a diagram of example operating environments, according to one or more embodiments.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a common multiuser communication session in an ER environment.

Although electronic device 200 and electronic device 210 may be participating in a common multiuser communication session, the XR environment may be presented differently on each device. As shown, the electronic device 200 may depict physical objects of the environment 240. As shown, physical table 222 may be depicted on the display 242 as a virtual table 224. In one or more embodiments, the display 242 may be a see-through display, and virtual table 224 may simply be a view of physical table 222 through display 242. As another example, the table or other surfaces may be presented in the form of a virtual surface, such as a representation of a plane. In one or more embodiments, a privacy protecting abstraction layer may be applied by obtaining and storing limited information about physical objects in a real environment.

Display 242 of electronic device 200 may also present an avatar 226 corresponding to user 232. For purposes of this disclosure, an avatar may include a virtual representation of a user. The avatar 226 may depict real-time actions of the corresponding user 232, including movement, updated location, and/or interactions with various physical components and/or virtual components within the multiuser communication session XR environment. An avatar may or may not mimic physical characteristics of the user, and may or may not mimic facial expressions of the user.

According to one or more embodiments, a multiuser communication session may support one or more multiuser communication applications or other modules which allow for depictions of shared virtual objects across all participating devices within a multiuser communication session, such as electronic device 200 and electronic device 210. As shown in display 242, presentation panel 230A is an example of a shared virtual object which may be visible to all participating devices.

As an example, returning to environment 250, electronic device 210 includes a display 252, on which the presentation panel virtual object 230B is depicted. It should be understood that in one or more embodiments, although the same virtual object may be visible across all participating devices, the virtual object may be rendered differently according to the location of the electronic device, the orientation of the electronic device, or other physical or virtual characteristics associated with electronic devices 200 and 210 and/or the multiuser communication session for which a representation is presented within displays 242 and 252.

Returning to environment 250, physical chair 234 is depicted as virtual chair 236. As described above, and one or more embodiments, display 252 may be a see-through display, and virtual chair 236 may be a view of physical chair 234 through the see-through display 252. In addition, electronic device 210 depicts an avatar 238 corresponding to user 220. Another characteristic of a multiuser communication session is that while virtual objects may be shared across participating devices, physical worlds may appear different. For instance, the representation of the multiuser communication session depicted in display 242 includes presentation panel 230A that also appears in the ER environment depicted in display 252. However, the representation of the multiuser communication session depicted in display 242 includes virtual table 224 which is a representation of physical table 222, which is not included in the representation of the multiuser communication session depicted in display 252. Similarly, the XR environment depicted in display 252 includes representation 236 of physical chair 234, which is not included in the representation of the multiuser communication session depicted in display 242.

According to one or more embodiments, the shared virtual objects, such as presentation panel 230, may be rendered as part of an application. In one or more embodiments, multiple applications may be executed within the multiuser communication session.

Figure 3:
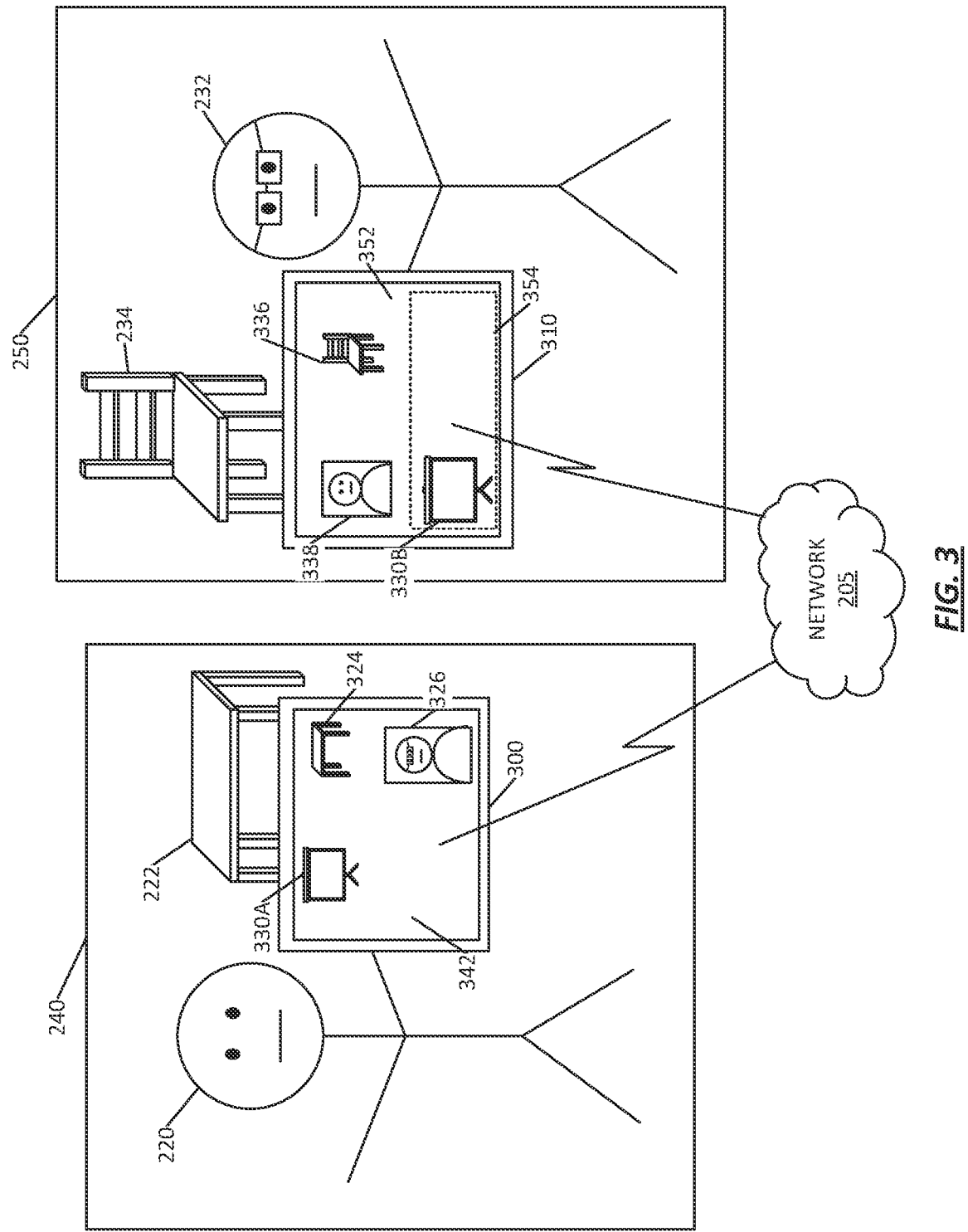
FIG. 3 shows an alternate diagram of example operating environments, according to one or more embodiments.

FIG. 3 shows a diagram of example operating environments, according to one or more embodiments. Specifically, FIG. 3 shows alternate presentation modes for the multiuser communication session compared to those described above with respect to FIG. 2. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 3, the first environment 240 includes a first user 220 that is utilizing a first electronic device 300, and the second environment 250 includes a second user 232 that is utilizing a second electronic device 310. In one or more embodiments, the first electronic device 300 and the second electronic device 310 include mobile devices, such as handheld devices, wearable devices, and the like.

In one or more embodiments the first electronic device 300 and the second electronic device 310 communicate with each other via a network 205. Examples of network 205 may include, for example, the Internet, a wide area network (WAN), a local area network (LAN), etc. In one or more embodiments, the first electronic device 300 and the second electronic device 310 may be participating in a common multiuser communication session in an XR environment.

Although electronic device 300 and electronic device 310 may be participating in a common multiuser communication session, the XR environment may be presented differently on each device, and may be presented using different display modes. As shown, physical table 222 may be depicted on the display 342 as a virtual table 324. In one or more embodiments, the display 342 may be a see-through display, and virtual table 324 may simply be a view of physical table 222 through display 342. As another example, the table or other surfaces may be presented in the form of a virtual surface, such as a plane.

Display 342 of electronic device 300 may also include a representation of user 232 in a stationary manner, such as avatar tile 326. For purposes of this disclosure, the avatar tile 326 may include a virtual representation of a user which is presented in a stationary location within a user's display, or within the user's view of the session. According to some embodiments, the location of the avatar tile 326 may be presented in a consistent location across other remote devices, such as devices active in a multiuser communication session in a room scale mode. Additionally, or alternatively, the avatar tile 326 may be placed in a particular location in the representation of the multiuser communication session, or in a particular location on the display 342 according to, for example, a predetermined setting, a user input, or a user preference. The avatar tile 326 may or may not mimic physical characteristics of the user, and may or may not mimic facial expressions of the user. The avatar may depict real-time actions of the corresponding user 232 including pose, gesture, and the like, without changing location on the display and/or within the multiuser communication session.

According to one or more embodiments, a multiuser communication session may support one or more multiuser communication applications or other modules which allow for depictions of shared virtual objects across all participating devices within a multiuser communication session, such as electronic device 300 and electronic device 310. As shown in display 342, presentation panel 330A is an example of a shared virtual object which may be visible to all participating devices. In one or more embodiments, components within the multiuser communication session, such as presentation panel 330A may be presented in a consistent configuration.

Turning to environment 250, electronic device 310 includes a display 352, which presents a representation of the multiuser communication session in a stationary mode. In the example, presentation panel virtual object 330B is depicted within a predetermined portion 354 of the display. Accordingly, while presentation panel 330A and presentation panel 330B refer to a same virtual object, the placement of the presentation panel across device 300 and device 310 will not appear consistent because of the differing display modes.

In one or more embodiments, the display 352 may also include a stationary representation of the remote users, such as user 220, as avatar tile 338. According to some embodiments, when a local user is in a stationary mode, one or more remote users are presented in a stationary manner regardless of the display mode at the remote devices. In one or more embodiments, in the stationary mode, components are presented such that they are accessible to a local user rather than reflecting "spatial truth" with other devices active in the multiuser communication session.

While FIGS. 2-3 show 2D representation of XR environments, including components of a multiuser communication session, it should be understood that in some embodiments, 3D representations can be presented. For example, a head mounted display or pass through display may be utilized to present the components of a multiuser communication session in an XR environment in a 3D manner.

Figure 4:
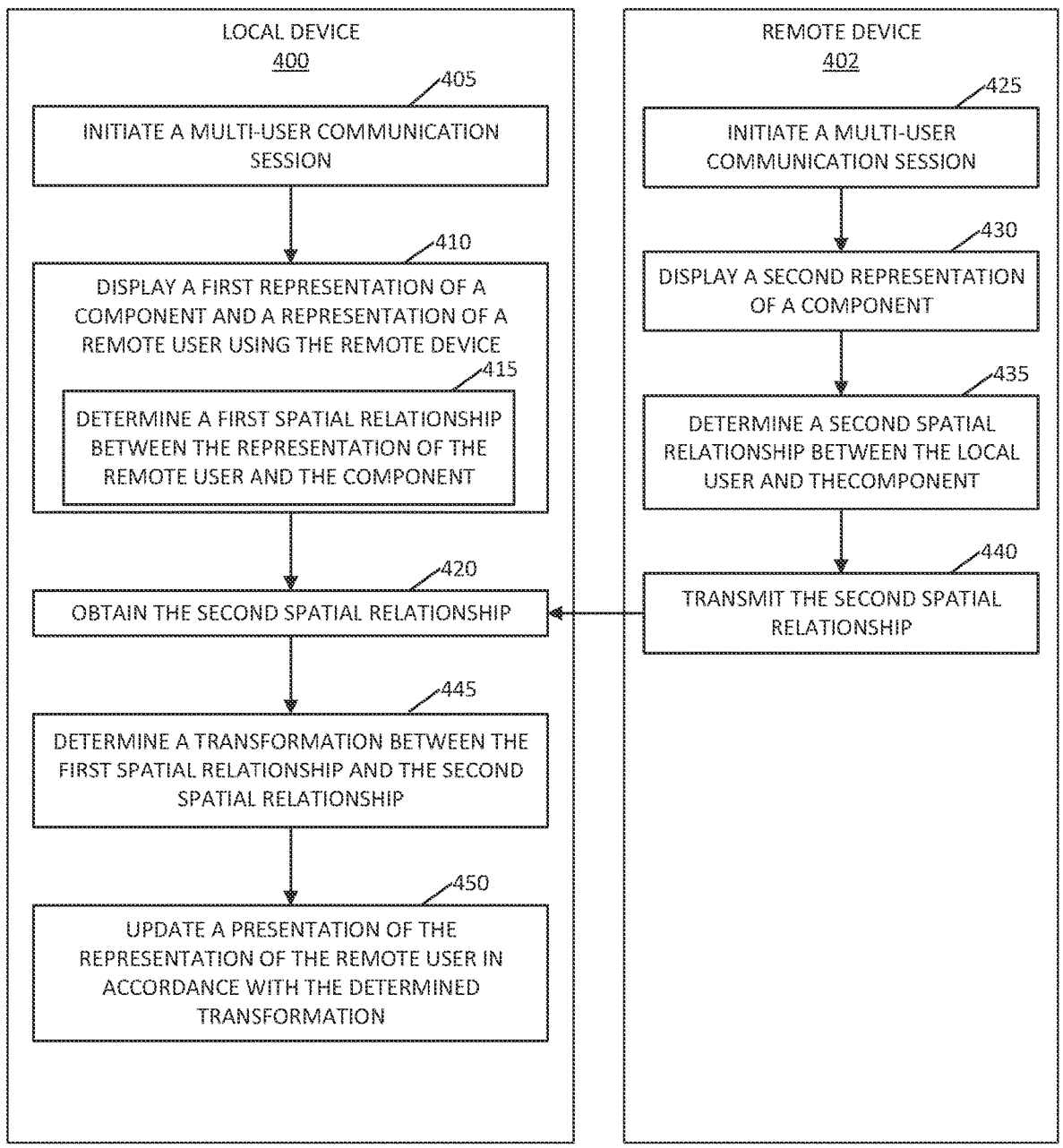
FIG. 4 shows a flowchart of a technique for retargeting attention cues, according to one or more embodiments.

FIG. 4 depicts the flowchart of a technique for retargeting an attention direction of a representation of the remote user, according to one or more embodiments. The flowchart is described with respect to processes that occur at a local device 400 and a remote device 402. For purposes of explanation, the flowchart is described utilizing the example components from FIG. 1. Although the flowchart shows various procedures performed by particular components in a particular order, it should be understood that according to one or more embodiments, the various processes may be performed by alternate devices or modules. In addition, the various processes may be performed in an alternate order, and various combinations of the processes may be performed simultaneously. Further, according to some embodiments, one or more of the processes may be omitted, or others may be added.

The flowchart begins at block 405, where the XR module 165 initiates a multiuser communication session with remote device 402. According to one or more embodiments, the multiuser communication session may include an extended reality environment in which shared components may be presented and utilized by multiple devices active in the multiuser communication session.

The flowchart continues at block 410, where the presentation module 170 displays a first representation of a component of the multiuser communication session and a representation of a remote user using the remote device 402. For example, the component may be a virtual object within the multiuser communication session that is visible to users active in the session. The representation of the remote user may be, for example, and avatar or other visual representation that is representative of a user of remote device 402. Although the flowchart describes the determination in terms of the spatial representation of the virtual object, it should be understood that the spatial relationship may be determined between the representation of the remote user and any component of the multiuser communication session, such as virtual objects, representations of other users, representations of applications, and the like. For example, a determination may be made in response to a determination that the remote user has performed in action that indicates attention toward the component, such as a gaze or a gesture for a predetermined amount of time in the direction of the virtual object, or some kind of manipulation or modification of the component.

At block 415, the presentation module 170 determines a first spatial relationship between the representation of the remote user and the virtual object. In one or more embodiments, the first representation of the multiuser communication session at local device 400 may be associated with a first coordinate system. The first spatial relationship may be provided in the first coordinate system and may indicate a relationship between the representation of the remote user and the component within the first representation of the session. In some embodiments, the presentation module 170 may not transform the spatial relationship. Instead, the presentation module 170 may merely track locations of components presented within the representation of the multiuser communication session.

Concurrently, processes may be occurring at remote device 402. At block 425, the remote device initiates the multiuser communication session with the local device 400. Accordingly, the local device 400 and the remote device 402 may be concurrently active in a same multiuser communication session. The flowchart continues at block 430, where the remote device 402 displays a second representation of the component. That is, the remote device 402 will present to the remote user a representation of the multiuser communication session that is specific to the remote device 402. For example, the representation of the multiuser communication session presented by remote device 402 may be presented from the point of view of the remote user using remote device 402. The component may be a virtual object or other component shared among the multiuser communication session, and, thus, visible and/or usable by local device 400 and device 402.

At block 435, the presentation module 170 determines a second spatial relationship between the local user and the virtual object. It should be understood that the local user in this context refers to the user of remote device 402, which from the perspective of local device 400 is the remote user. The second spatial relationship refers to a relationship between a point of view of the user of remote device 402 within a representation of the multiuser communication session presented by remote device 402 and the representation of the virtual object as it is displayed in the representation of the multiuser communication session presented by remote device 402. According to one or more embodiments, the remote device 402 may be associated with a second coordinate system. As such, the second spatial relationship may be determined in the second coordinate system. The flowchart continues at block 440, where the second spatial relationship is transmitted to the local device 400. In some embodiments, the spatial relationship may indicate a direction toward which the user of the remote device is directing attention. Further, in some embodiments, the spatial relationship may merely indicate the component to which the user of the remote device is directing attention.

Returning to local device 400, the flowchart continues at 420, where the local device 400 obtains the second spatial relationship received from remote device 402. The flowchart continues to block 445, where the local device 400 determines the transformation between the first spatial relationship and the second spatial relationship. According to one or more embodiments, the transformation may take into account the differing coordinate systems of the local device 400 and the remote device 402. In some embodiments, the transformation may merely indicate a direction the representation of the remote user should gaze based on the attention direction, and/or a component toward which the remote user is directing attention.

The flowchart concludes at block 450, where the presentation module 170 updates the presentation of the representation of the remote user in accordance with the determined transformation. As an example, if at the remote device 402, a user is gazing toward the virtual object that appears to the remote users left, the presentation module 170 will re-target the gaze of the representation of the remote user in the local representation of the multiuser communication session to gaze towards the virtual object even if it is to the right of the representation of the remote user in the local view.

Figure 5:
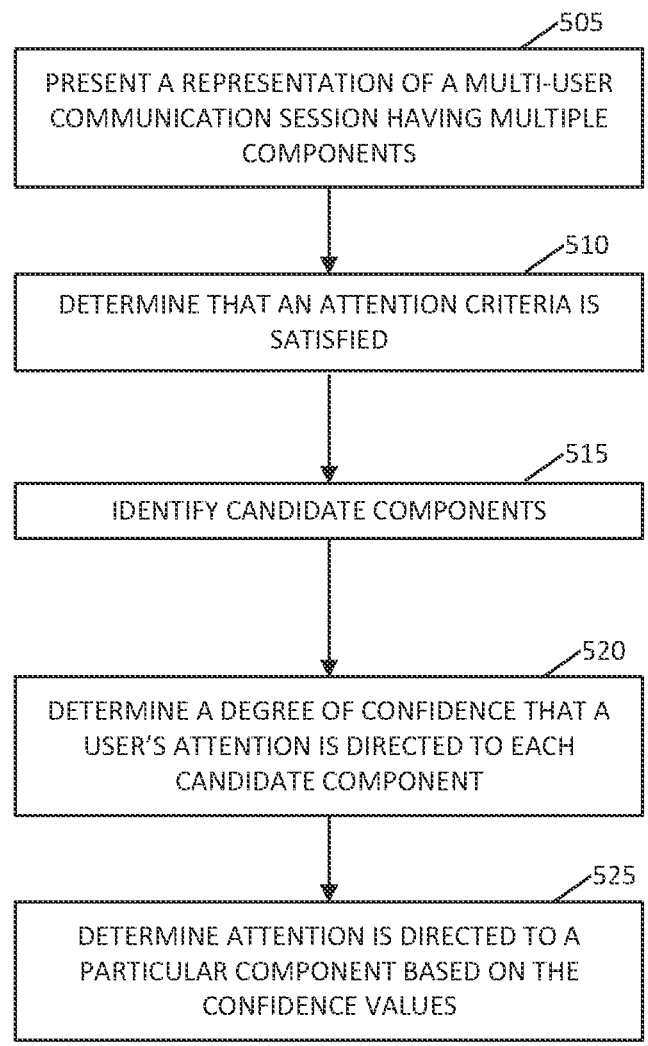
FIG. 5 shows a flowchart of a technique for determining an attention direction, according to one or more embodiments.

In one or more embodiments, the relationship between a remote user and a virtual object or other component in the multiuser communication session may be determined in response to determining that a remote user is directing attention to a component of the multiuser communication session. FIG. 5 depicts a flowchart of a technique for determining a component of a multiuser communication session toward which a remote user is directing attention. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at 505, where the presentation module 170 presents a representation of a multiuser communication session having multiple components. At block 510, a determination is made that an attention criterion is satisfied. The attention criterion may include a determined a gaze direction toward a component of the multiuser communication session for a predetermined amount of time, a presentation of a predetermined directional gesture for a predetermined amount of time, user-provided input indicating the user is directing attention to a particular component, modification or manipulation of a component by the user, and the like.

At block 515, a set of candidate components are identified which may include components of the multiuser communication session to which the remote user is potentially directing attention based on the determination that the attention criterion is satisfied. For example, the gaze or pose of the user may be directed toward an area within the representation of the multiuser communication session presented by remote device 402. Components of the session within the area may be identified as candidate components.

The flowchart continues at block 520, where a degree of confidence is determined for each candidate component corresponding to a likelihood that a user's attention is directed to the corresponding candidate components. In one or more embodiments, a subset of the identified candidate components may be used. The confidence value may be determined in a number of ways. For example, the confidence value may be determined based gaze information, where a gaze tracking device at the remote device 402 tracks the gaze of a user of remote device 402. As another example, hand tracking or other visual data or sensor data may be used to interpret an intended direction of a user's gesture or gaze. In one or more embodiments, a user's manipulation or modification of a component of the multiuser communication session may be a strong indication that the manipulated or modified component is the subject of the user's attention. The confidence value may be provided as a numerical value, or a relative value among the candidate components.

The flowchart concludes at block 525, where the presentation module 170 determines that the attention is directed to a particular component based on the confidence values. For example, a particular component of the candidate components may be selected based on a high, or relatively high, confidence value. For example, a threshold confidence value may be utilized. In one or more embodiments, if no candidate component is associated with a threshold confidence value, no component may be determined to be the subject of the user's attention.

Figure 6:
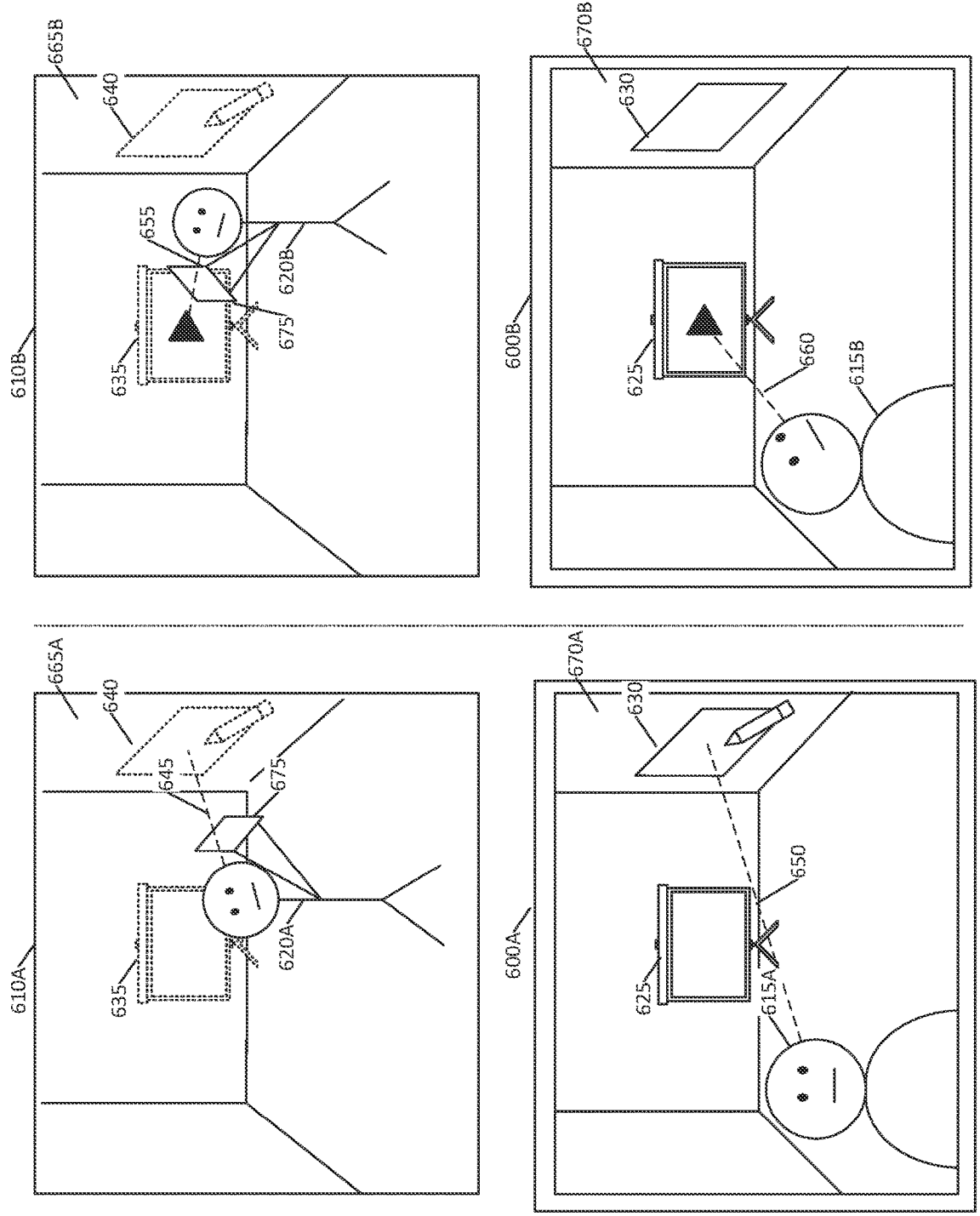
FIG. 6 shows an example diagram of a technique for redirecting attention cues in a multiuser communication session, in accordance with one or more embodiments.

FIG. 6 depicts an example embodiment of a technique for re-targeting an intended direction in a multiuser communication session. For purposes of the example, the various components and processes will be described with respect to FIGS. 1-5 as described above. It should be understood that the various processes may be performed by additional components and that the example depicted in FIG. 6 is merely provided for explanatory purposes.

The example diagram presented in FIG. 6 provides a real world environment at two different times 610A and 610B, along with the representation of the real world environment 600A and 600B at each corresponding time, as perceived by a user of a device displaying representation 600. FIG. 6 depicts a user 620 moving within a physical environment 665. Concurrently, user representation 615 depicts a virtual representation of the user 620 as it is presented to a user of device 600.

The user may be using a device 675 to view components of a multiuser communication session, such as a virtual display panel 635, and a virtual writing panel 640. Accordingly, the virtual display panel 635 and the virtual writing panel 640 are depicted using dotted lines to indicate that they are not physically present in the physical environment 665. Rather, they are visible to the user 620A in the physical environment 665 of the electronic device 675, which allows user 620A to participate in the multiuser communication session.

Representation 600A shows a visual representation of the multiuser communication session as viewed by a local user in the same multiuser communication session. As such, the representation of the multiuser communication session 600A includes a representation of user 620A as avatar 615A. Further, the representation of the multiuser communication session 600A includes representations of the various shared components in the multiuser communication session, such as the virtual display panel 625 and the virtual writing panel 630.

According to one or more embodiments, a local device that presents representation 600A may determine or receive an indication that an attention criterion has been satisfied, indicating that the remote user 620A is directing attention to a particular component in the multiuser communication session. The local device may receive or otherwise obtain an indication of the components in the multiuser communication session to which the remote user 620A is directing attention. In the example depicted, user 620A is depicted as directing attention to virtual writing panel 640. In one or more embodiments, the local device may additionally or alternatively receive an indication of a spatial relationship 645 between the remote user 620A and the identified component, such as a transformation in a coordinate system associated with the remote representation of the multiuser communication session in which the remote user 620A is directing attention to the virtual writing panel 640. The spatial relationship may include an orientation of the user, a direction of the user, such as a gaze direction or a gesture direction, a gaze vector of the user, an indication of a target of the user's gaze, and the like. According to one or more embodiments, the spatial relationship may identify the component in the multiuser communication session to which the remote user 620A is directing attention.

In some embodiments, the local device determines a second spatial relationship between the representation of the remote user, such as avatar 615A, and the component to which the remote user is directing attention, such as virtual writing panel 630 in the local representation of the multiuser communication session. According to one or more embodiments, the second spatial relationship may be based on a viewpoint of the representation of the remote user 615A and the like. The second spatial relationship 650 may be based on a coordinate system specific to the local representation of the multiuser communication session 670. In some embodiments, the local device additionally determines a spatial transformation between the first spatial relationship and the second spatial relationship. In some embodiments, the second spatial relationship may be an indication of the target component in the local view, or a location of the target component in the local view. Then the local device modifies the presentation of the representation of the remote user 615A to re-target the orientation of the representation, such as a gaze or a gesture, to match the intended target. As such, user 620A may be gazing at virtual writing panel 640 in the physical environment 665, while the representation of the remote user 615A is gazing at the virtual writing panel 630 in the local representation of the multiuser communication session 670.

Similarly, 610B depicts the physical environment 665 in which the remote user 620B is now directing attention to virtual presentation panel 635. At 610B, the remote user 620B has moved to a new location in the physical environment 665, and from the remote user's perspective, is located to the right of the virtual presentation panel 635. As described above, the remote user may provide an indication of a spatial relationship between the remote user and the virtual presentation panel 635 within a remote representation of the multiuser communication session provided by device 675.

The local device presenting representation 600B depicts the update to the local representation of the multiuser communication session 670 based on the actions depicted at 610B. For purposes of this example, the representation of the remote user 615B has not moved locations in the current local representation of the multiuser communication session 670B. As such, in the local representation of the multiuser communication session 670, the remote user 615B appears to the left of the virtual presentation panel 625. In response to receiving the spatial relationship between the remote user 620B and the virtual presentation panel 635 in the remote representation of the multiuser communication session, device 600B can determine the current location of the local representation of the remote user 615B, and thus re-target the pose of the representation of the remote user 615B such that the remote user appears to be gazing at the virtual representation panel 625, as shown by gaze direction 660. Accordingly, although in the physical environment 665, the remote user 620B is gazing to his right, the virtual representation of the user in the local representation of the multiuser communication session 670 presents the avatar of the remote user 615B as gazing to his or her left.

Although not depicted in the example, in some embodiments the local device may additionally determine a spatial relationship between the viewpoint of a local user of the device 600B relative to the components of the multiuser communication session in the local representation of the multiuser communication session. The spatial relationship between the local user and the component may then be transmitted to the remote device such that a remote representation of the local user may also be updated to provide context as to where the user is located. According to one or more embodiments, the relationship between the local user and the component may be determined in accordance with a determination that the local user is paying attention to the same target component to which the remote user brought attention. For example, the local user may be gazing in the direction of the target component, performing a pose directed toward the target component, or the like. For example, the gaze of the local user may be determined based on gaze tracking data collected by the local device 600B. As another example, a gesture may be determined based on him tracking data or other data collected at device 600B.

Figure 7:
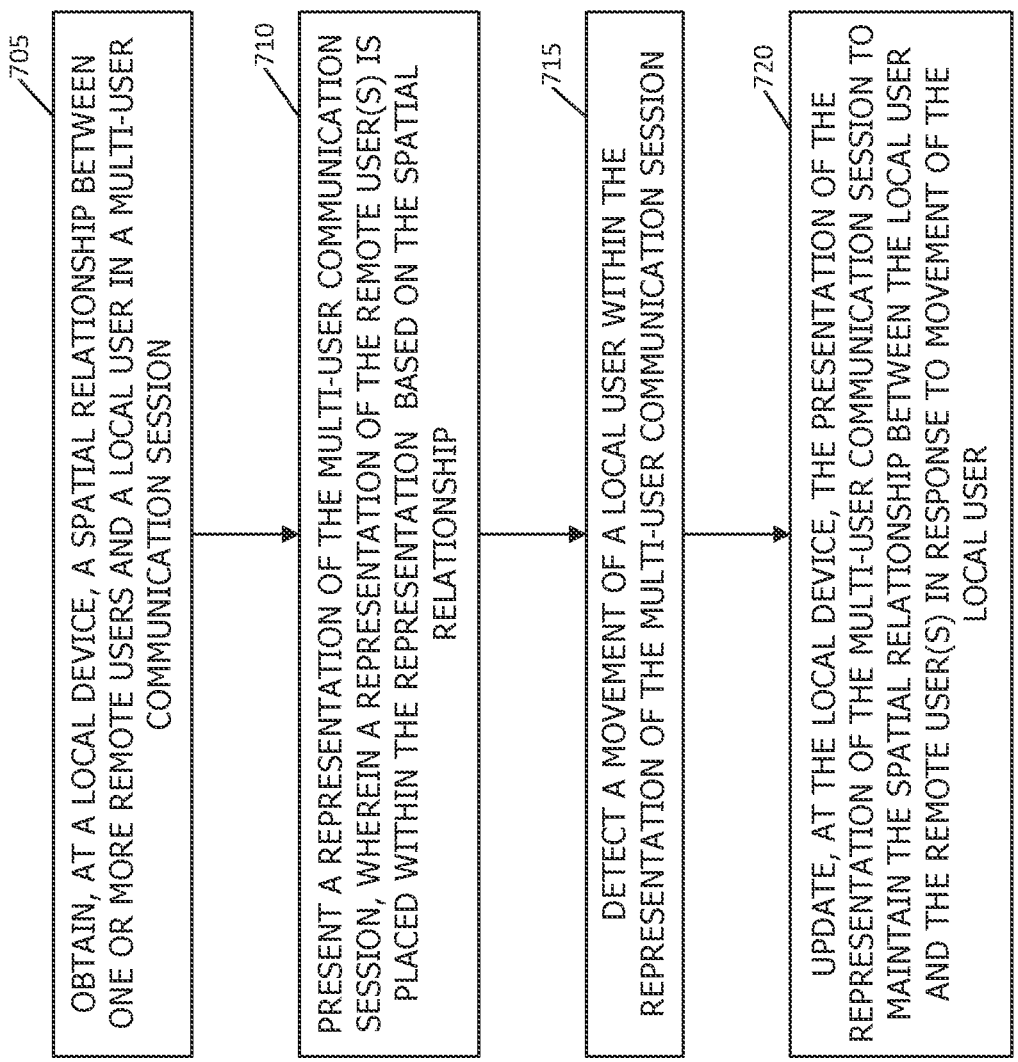
FIG. 7 shows a flowchart of a technique for presenting representations of remote users in a multiuser communication session in a consistent manner, according to one or more embodiments.

FIG. 7 depicts a flowchart of a technique for providing a presentation of remote users in a multiuser communication session in a manner that remains consistent regardless of movements of the local user. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added. The flowchart begins at block 705, where the presentation module 170 obtains a spatial relationship between the remote user and the local user in a multiuser communication session. According to some embodiments, the spatial relationship may be obtained based on a current spatial relationship between the users. Additionally, or alternatively, the spatial relationship may be determined based on user input. For example, a local user may select a predetermined configuration, a user defined configuration, or the like. In one or more embodiments, the configuration may be determined based on a number of remote users active in the multiuser communication session. As an example, a local user may manipulate representations of remote users in the local representation of the multiuser communication session to be displayed at preferred locations in relation to the local user. In some embodiments, the spatial relationship may comprise a distance between a local user and the representation of each of one or more remote users in a local representation of the multiuser communication session. In some embodiments, the spatial relationship may comprise an angle offset from a local user within the representation of the multiuser communication session. The flowchart continues at block 710, where the presentation module 170 presents a representation of the multiuser communication session where the representations of the remote users are placed within the representation based on the spatial relationship.

The flowchart continues at block 715, where the presentation module 170 detects the movement of a local user within the representation of the multiuser communication session. As an example, the presentation module may detect movement of a local device. As another example, the presentation module may detect a change in gaze or pose that causes the local user to view a different area of the multiuser communication session. The movement may be detected for example based on sensor data, for example by sensors 125 on electronic device 100 as described above.

The flowchart concludes at block 720, where the presentation module 170 updates the presentation of the representation of the multiuser communication session to maintain the spatial relationship between the local user and the remote user in response to the movement of the local user. For example, if the local user selects for avatars for remote users to be aligned to the left of the local user, and the local user turns to the left, the avatars of the remote users do not appear in front of the user. Rather, the avatars of the remote users continue to appear to the left of the local user.

Figure 8:
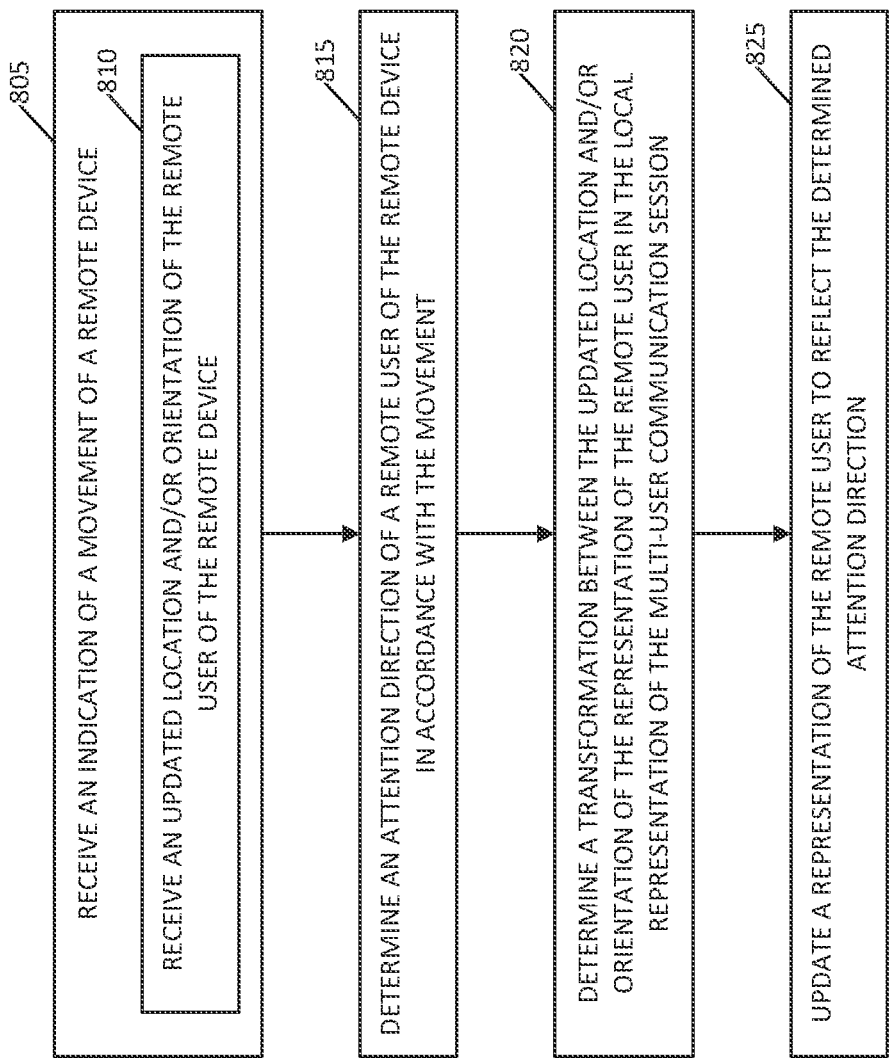
FIG. 8 shows a flowchart of a technique for updating representations of remote users in a multiuser communication session, according to one or more embodiments.

FIG. 8 depicts a flowchart of a technique for re-targeting an attention direction of a representation of the remote user in a pinned mode. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at block 805, where the local device receives an indication of the movement of the remote device. The movement may indicate a change in location and/or orientation of the remote device, as described in block 810. The updated location and orientation of remote user may be detected, for example, by sensor data collected by one or more sensors on a remote device. The change in orientation may include, for example, a head pose, body pose, gaze direction, gesture direction, or the like.

The flowchart continues to block 815, where the presentation module 170 determines an attention direction of the remote user of the remote device in accordance with the movement. In one or more embodiments, an attention direction may be associated with a component of the multiuser communication session, such as a virtual object or another user in the session. A virtual object may include, for example, an interactive application or other component in the multiuser communication session. The attention direction may be determined, for example, based on a target of a gaze, a target of a gesture, or the like. For example, a gaze vector or vector from a gesture may be determined and utilized to identify a target virtual object toward which the remote user is directing attention. As another example, an interaction between a user and an interactive application may determine that the attention of the remote user is directed toward the interactive application.

At block 820, the presentation module 170 determines a transformation between the updated location and/or orientation of the remote user and the representation of the remote user in the local representation of the multiuser communication session. That is, a transformation may be determined between a pose and/or location of the remote user in the remote physical environment compared to the in representation of the user in the local representation of the multiuser communication session. In one or more embodiments, the transformation may determine a spatial transformation between and attention vector, such as a gaze vector or gesture vector (e.g., vector between a gesture intended to direct attention and the subject of the attention) in the local representation of the multiuser communication session. As such, the remote user may change orientation, such as rotation, but will not change location in representation of the multiuser communication session.

The flowchart concludes at block 825, where the presentation module 170 updates the representation of the remote user to reflect the determined attention direction. For example, the representation of the remote user in the local representation of the multiuser communication session may be presented such that the attention vector targets a same component of the multiuser communication session as the remote user in the remote user's representation of the multiuser communication session.

Figure 9:
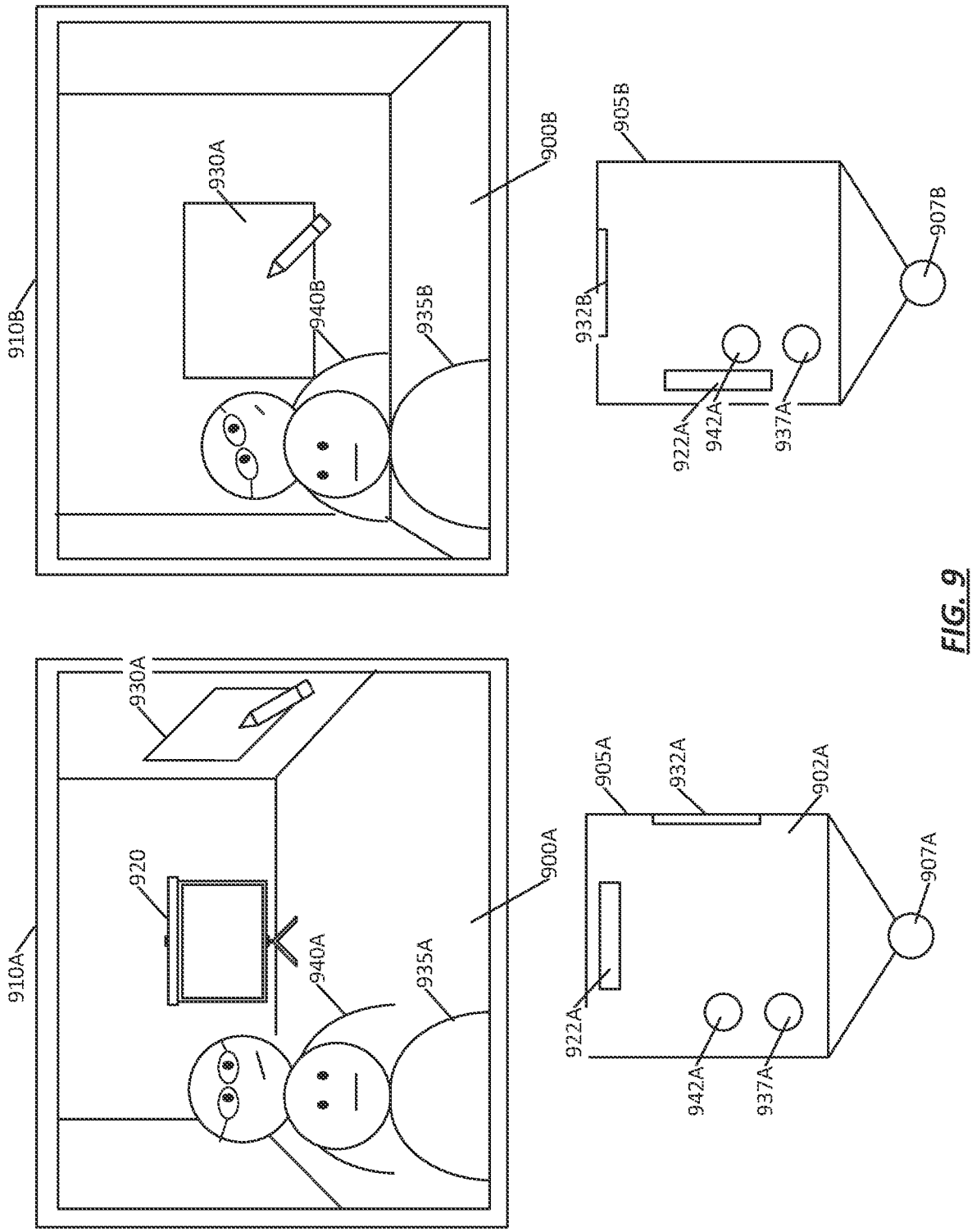
FIG. 9 shows an example diagram of a technique for presenting representations of remote users in a multiuser communication session in a consistent manner, in accordance with one or more embodiments.

FIG. 9 depicts an example of the representation of the multiuser communication session in which representations of remote users are displayed in a pinned mode. According to one or more embodiments, a pinned presentation mode includes affixing representations of remote users in a consistent spatial relationship with the local user, such that as the local user changes location and/or orientation, the location of the remote users relative to the local user remains the same. Device 900A includes a first representation of the multiuser communication session 910A. The multiuser communication session includes various components, such as virtual presentation panel 920 and virtual writing panel 930. In addition, the multiuser communication session includes representations of remote users, such as representation of the first user 935A and representation of a second user 940A.

Overhead view 905A depicts an overhead view of the representation of the multiuser communication session 910A. The overhead view 905A is depicted from the point of view of user 907A, which is a local user of a device presenting the representation of multiuser communication session 910A. As shown, the overhead view of the presentation panel 922A is depicted directly across from the user 907A, and the overhead view of the virtual writing panel 932A is depicted to the right of the user 907A. The overhead view of remote user 942A represents the overhead view of the placement of remote user 940A, and the overhead view of remote user 937A represents the overhead view of the placement of remote user 935A. As such, the overhead view of remote users 942A and 937A shows that the representations of the remote users are presented along the left side of the view of user 907A.

At 900B, the device includes a second view of a representation of the multiuser communication session 910B. For example, the second representation of the multiuser communication session 910B includes the multiuser communication session at a second time after the local user has changed positions or moved within a local physical environment. As shown, the representation of the multiuser communication session 910B depicts the same multiuser communication session of 910A, where the local user has moved within the environment ninety degrees to the local user's right. As such, whereas in 910A, the virtual presentation panel 920 was directly in front of the local user, and representation 910B, the virtual writing panel 930 is directly in front of the local user. Notably, the representations of the remote users 935 and 940 remain the same with respect to the local user. As such, the representation of the first remote user 935B remains in front of the local user and offset to the left, and the representation of the second remote user 940B remains behind the representation of the first user 935B. Notably, the spatial relationship between the various users in the multiuser communication session may not be consistent with the representation of the multiuser communication session when the representations of the remote users are presented in a pinned mode.

Overhead view 905B depicts an overhead view of the representation of the multiuser communication session 910B. The overhead view 905B is depicted from the point of view of user 907B, which is a local user of a device presenting the representation of multiuser communication session 910B. As shown, the overhead view of the presentation panel 922B is depicted to the left of the user 907B, and the overhead view of the virtual writing panel 932B is depicted directly across the user 907B. The overhead view of remote user 942B represents the overhead view of the placement of remote user 940B, and the overhead view of remote user 937B represents the overhead view of the placement of remote user 935B. As such, the overhead view of remote users 942B and 937B shows that the representations of the remote users remain presented along the left side of the view of user 907B. In some embodiments, the remote users' movement may be limited or restricted in this mode. For example, remote users 935 and 940 may be unable to move locations within the representation of the multiuser communication session, however, in some embodiments, the remote users can change orientation, such as head pose, body pose, or direction of gaze.

Figure 10:
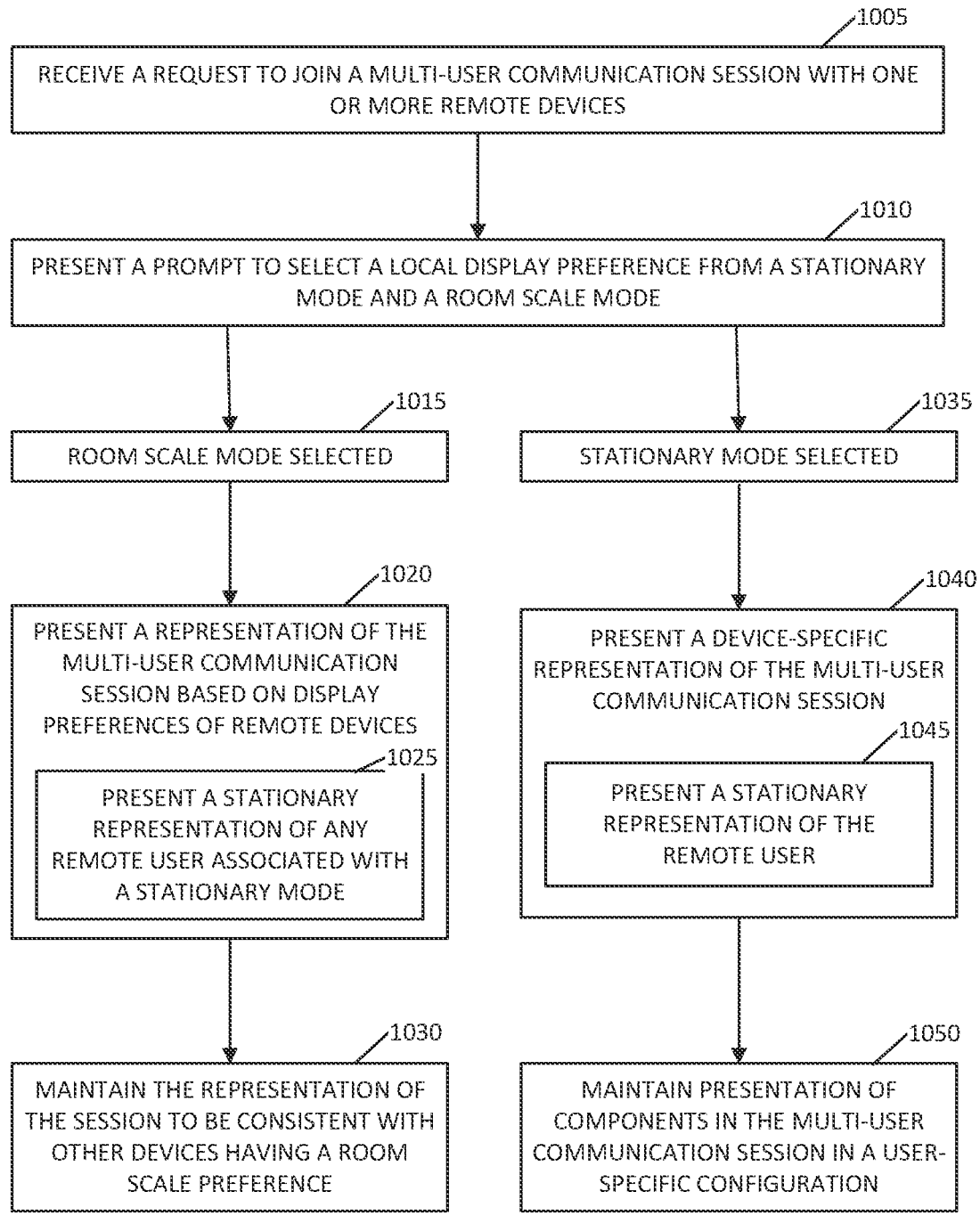
FIG. 10 shows a flowchart of a technique for presenting representations of remote users in a multiuser communication session in hybrid modes, according to one or more embodiments.

FIG. 10 depicts a flowchart of a technique for providing an interface for a user to select a presentation mode of a multiuser communication session according to some embodiments. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at block 1005, where the local device receives a request to join a multiuser communication session with one or more remote devices. The request may be received, for example, by a local user through user input. At block 1010, the presentation module 170 presents a prompt to select a local display preference from a set of the display modes. In some embodiments, the set of display modes may include, for example, a stationary mode and a room scale mode. As described above, a room scale mode presents components of the multiuser communication session in a configuration that is consistent with other active users also utilizing a room scale mode so as to establish "spatial truth." The stationary mode includes a display mode in which components of the multiuser communication session are presented in a matter such that they are convenient to the local user. For example, one or more of the components may be presented within reach of the user, or otherwise in close proximity to the user so that the user does not need to move around a local physical environment in order to interact with the components.

In some embodiments, the flowchart continues to block 1015, where room scale mode is selected. At block 1020, the presentation module 170 presents a representation of the multiuser communication session based on the display session preferences of the remote devices. In some embodiments, the room scale mode includes presenting components of the multiuser communication session in a configuration consistent with other users in the room scale mode in the multiuser communication session. As such, the local device may receive an indication of the configuration of the components from other remote devices in the room scale mode. Additionally, or alternatively, the local device may receive an indication that the one or more remote users are presenting remote representations of the multiuser communication section in the room scale mode without identifying information.

According to some embodiments, representations of remote users using a stationary mode may be presented in a stationary manner in the local room scale mode presentation. Thus, at block 1025, the presentation module may present a stationary representation of any remote user associated with the stationary mode. In some embodiments, the orientation of users in stationary mode may be updated, but the location may stay constant. According to one or more embodiments, the stationary representation of the remote user may be presented in a predetermined location, a user selected location, or the like. Further, in one or more embodiments, the location of the stationary representation may be based on a location within the multiuser communication session, or based on the location on a display.

The flowchart continues to block 1030, where the presentation module 170 maintains the representation of the session to be consistent with other devices presenting in a room scale mode. For example, if a remote device manipulates a component in the multiuser communication session, and indication of the manipulation will be transmitted to the local device for presentation within a local representation of the multiuser communication session. Further, in some embodiments, a local user's movement or manipulation of a component in the multiuser communication session may be transmitted to other remote users in room scale mode such that the consistency between the presentations may remain.

Returning to block 1010, a user may alternatively select the stationary mode, as shown in block 1035. At block 1040, the presentation module 170 presents the device specific representation of the multiuser communication session. As described above, the configurations of components displayed in a stationary mode may be device specific because the components of the multiuser communication session may be presented in such a manner as to be usable to a local user from a stationary location in a physical environment. Said another way, one or more components of the multiuser communication session may be presented at a location in the multiuser communication session, or alternatively in a location on a display of the local device, such that the local user can interact with one or more of the components without changing physical location.

At block 1045, the presentation module 170 presents a stationary representation of the remote users. In one or more embodiments, the representations of the remote users may be placed, for example, in a predetermined portion of the display of the local device, or in a predetermined location in the multiuser communication session. Further, in one or more embodiments, the stationary representations of the remote users may be placed in accordance with a system setting, or a user preference.

The flowchart concludes at block 1050, where the presentation module 170 maintains presentation of components in the multiuser communication session in a user specific configuration. In one or more embodiments, the location of the various components may be stationary throughout the duration of the session. Further, in some embodiments, the location or configuration of the various components may change based on user activity or user preference. For example, most recent active components may be presented at a particular time while other components may be presented in a minimized mode, or may not be presented.

Figure 11:
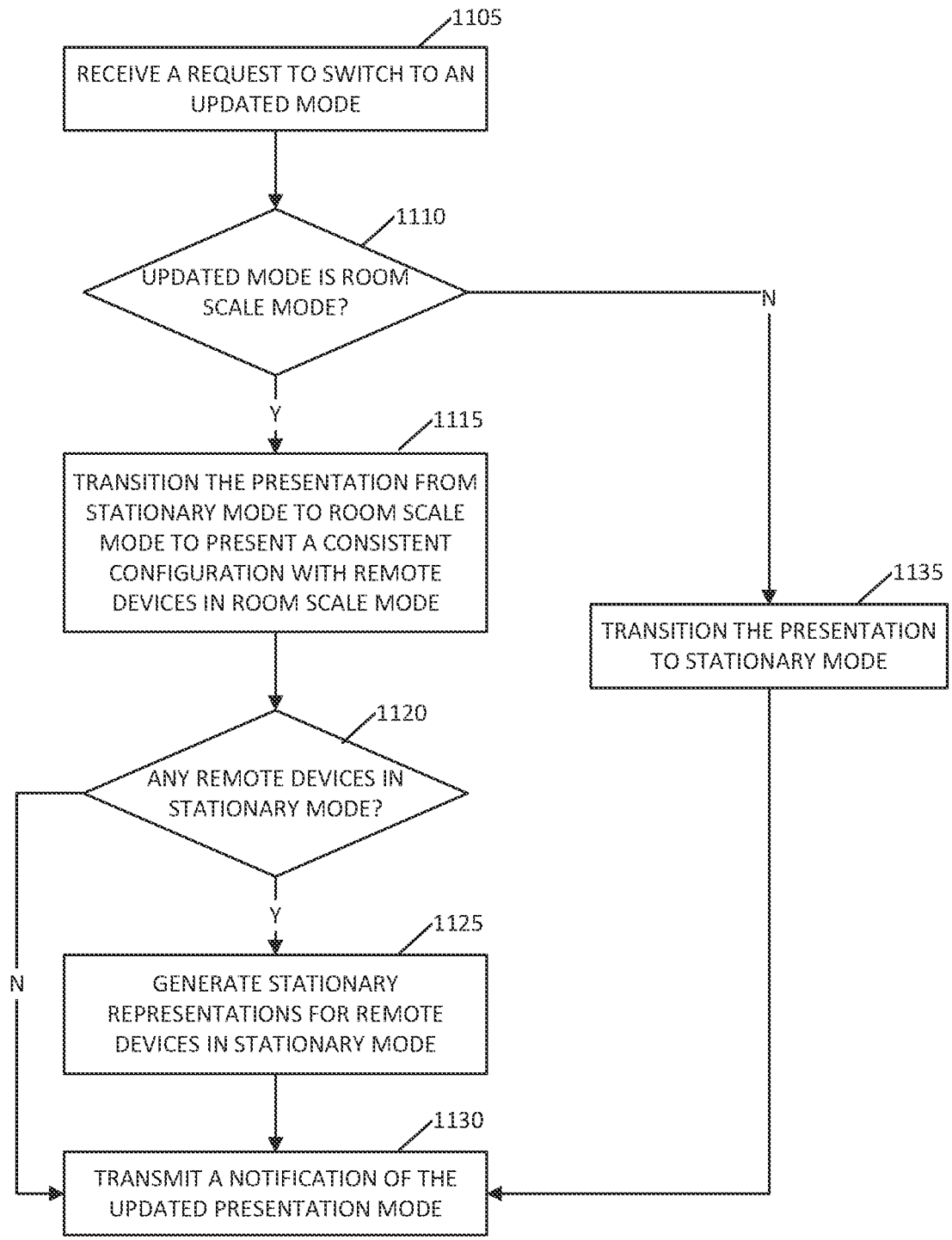
FIG. 11 shows a flowchart of a technique for transitioning between display modes in a multiuser communication session, according to one or more embodiments.

FIG. 11 depicts a flowchart of a technique for changing presentation modes during an active multiuser communication session. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at block 1105, where the presentation module receives a request to switch to an updated mode, for example, between a stationary mode and a room scale mode. The request may be received for example via a user interface or otherwise by user input from a local user. At block 1110, a determination is made as to whether the updated mode is a room scale mode. In one or more embodiments, the updated mode may be selected from a stationary mode and a room scale mode, as described above.

If a determination is made at block 1110 that the updated mode is a room scale mode, then the flowchart continues to block 1115. At block 1115, the presentation module 170 transitions the presentation from the stationary mode to the room scale mode to present components of the multiuser communication session in a consistent configuration with remote devices also in room scale mode. For example, the local device may receive an indication of a current configuration of components of the multiuser communication session as they are presented to users in the room scale mode. In one or more embodiments, the local device may receive an indication of remote users currently in room scale mode from which the configuration may be determined. In one or more embodiments, transitioning the presentation to room scale mode may include presenting transitional frames or image data in order to generate a visual transition between the stationary mode and the room scale mode. For example, the visual transition may include the room scale presentation of the multiuser communication session to fade into the local user's view.

The flowchart continues to block 1120, where determination is made as to whether any remote devices are in stationary mode. In one or more embodiments, a current display mode may be received for each remote device. In some embodiments, an indication of remote devices in stationary mode may be received at the local device. If at block 1120, a determination is made that the remote devices include at least one device in stationary mode, then the flowchart continues to block 1125. At block 1125, the presentation module 170 generates a stationary representation for the remote users in stationary mode and generates room scale representations for the remote users in room scale mode. In one or more embodiments, the local device may receive a stationary representation or image data to be utilized for the stationary representation from the remote device. According to some embodiments, the stationary representation may be displayed at a user-defined location on a display or in the local representation of the multiuser communication session. In some embodiments, the stationary representation for the remote user may be movable by the local user within the local representation of the multiuser communication session.

The flowchart continues to block 1130, which is also the next process in the flowchart if no remote devices are in stationary mode as determined at block 1120. At block 1130, a notification of the updated presentation mode is transmitted to remote users. In one or more embodiments, if the local user has switched from a stationary moved to a room scale mode, a location of the current user and other information may be transmitted to the remote devices in order to maintain consistent configuration of components of the multiuser communication session across devices using the room scale mode.

Returning to block 1110, if a determination is made that the updated mode is not room scale mode, then the updated mode may be a stationary mode, and the flowchart continues to block 1135. At block 1135, the presentation module 170 transitions the presentation to stationary mode. As described above, the stationary mode may be device-specific in that the components of the multiuser communication session may be presented in such a manner as to be usable to a local user from a stationary physical location. Said another way, one or more components of the multiuser communication session may be presented at a location in the multiuser communication session, or alternatively in a location on a display of the local device, such that the local user can interact with one or more of the components without changing location. In addition, the presentation module 170 may present a stationary representation of the remote users, regardless of the mode (room scale or stationary) selected by those remote users. In one or more embodiments, the representations of the remote users may be placed, for example, in a predetermined portion of the display of the local device, or in a predetermined location in the multiuser communication session. Further, in one or more embodiments, the stationary representations of the remote users may be placed in accordance with a system setting, or a user preference.

The flowchart concludes at block 1130, where the presentation module transmits notification of the updated presentation mode. If the user switched from a room scale mode to a stationary mode, an indication that the user is in stationary mode may be transmitted to remote users in order to update remote representations of the multiuser communication session to include a stationary representation of the local user. Further, remote users in room scale mode may no longer consider configuration data from the local user in order to maintain consistent configuration of components of the multiuser communication session across devices in the room scale mode.

Figure 12:
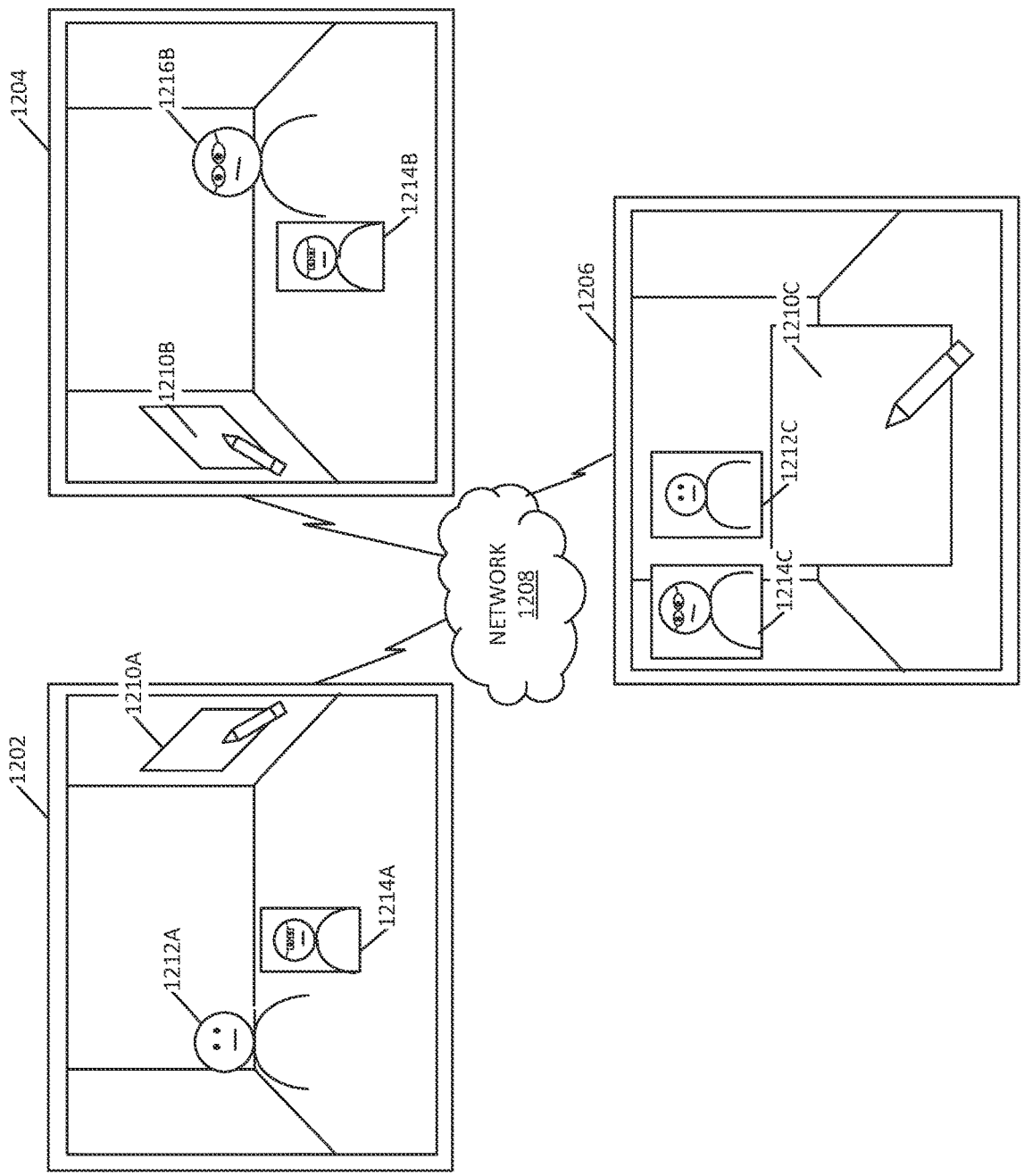
FIG. 12 shows an example diagram of a technique for presenting representations of remote users in a multiuser communication session in differing presentation modes, in accordance with one or more embodiments.

FIG. 12 depicts an example system diagram in which three devices are active in a multiuser communication session across network 1208. The devices in the multiuser communication session share a virtual writing panel 1210. Devices 1202 and 1204 include representations of the multiuser communication session in a room scale mode. Accordingly, device 1202 depicts a room scale representation of remote user 1212A, which is a representation of a user of device 1204, and the stationary representation of the remote user 1214A, which is a representation of a user of device 1206. Meanwhile, device 1204 depicts a representation of the multiuser communication session including a room scale version of the user of device 1202 as avatar 1216B, and a stationary representation of a user of device 1206 as stationary representation 1214B.

Device 1206 presents a stationary version of the multiuser communication session. Accordingly, device 1206 presents the local representation of the virtual presentation panel 1210C in a location that is inconsistent with the remote devices, but is convenient for the local user. As described above, the location of the presentation of the virtual object may be determined based on a predetermined location on the display, a predetermined location in the multiuser communication session, a user directed location, and the like. Device 1206 additionally displays stationary representations of each user, regardless of the presentation mode of each of the remote users. Accordingly, device 1206 depicts the representation 1214C, which is associated with the user of device 1202, as well as representation 1212C, which is associated with the user of device 1204. The stationary representations of the remote users may be presented in a predetermined location on the display or in the multiuser communication session, or may be placed in accordance with user preferences, or the like.

As described above, each representation of the multiuser communication session in a room scale mode may be presented such that components within the session are consistently displayed. Accordingly, the representation 1214A and 1214B may be placed in a manner such that the location of the remote user appears consistent to both users of 1202 and 1204. Further, in one or more embodiments, the stationary representation 1214 may be manipulated or moved by one or more of the users of devices 1202 and 1204. The movement or manipulation of the stationary representation of the user may be propagated to other users in room scale mode such that the movement or manipulation is presented to all users in room scale mode.

Figure 13A:
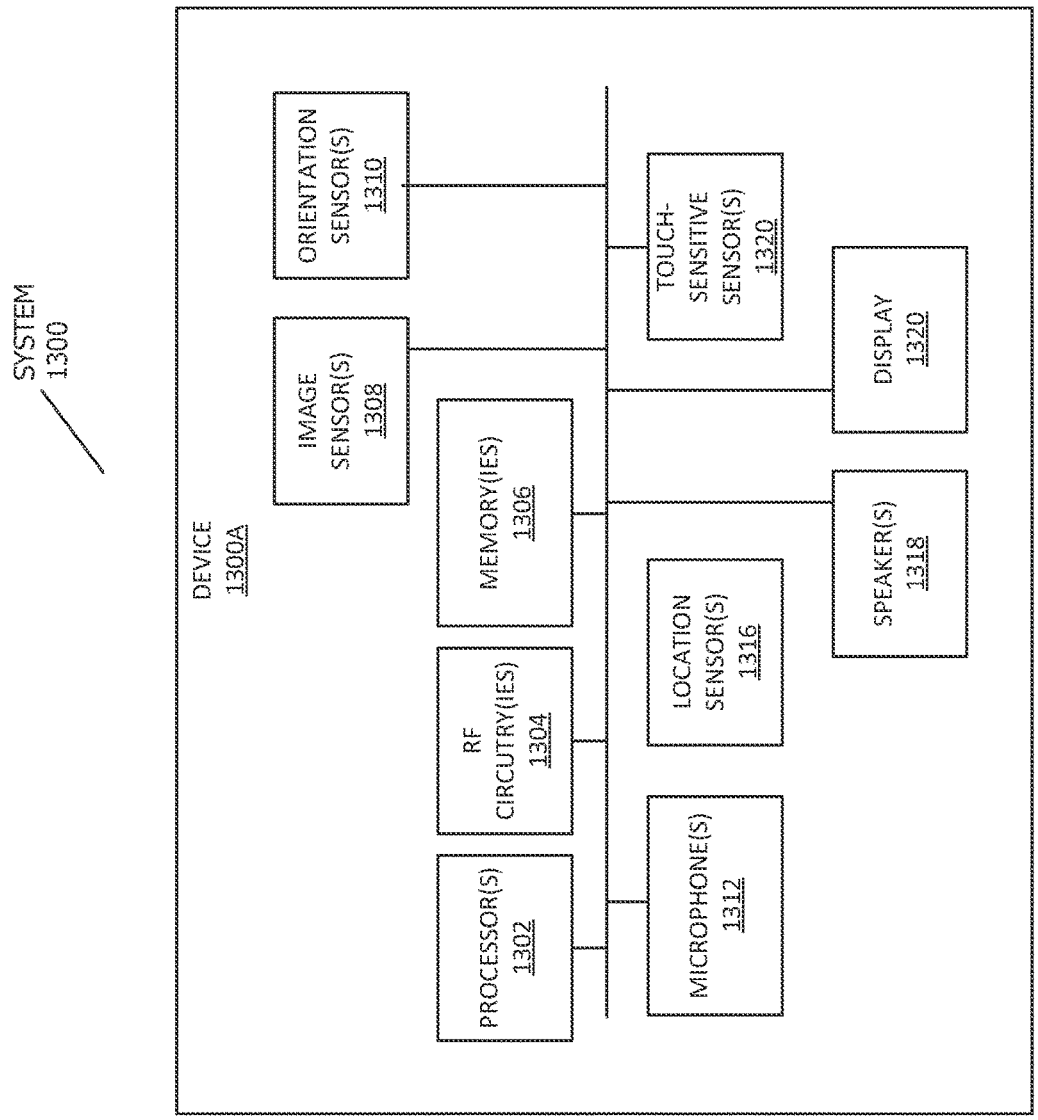
FIGS. 13A and 13B show, in block diagram form, exemplary systems for use in various extended reality technologies according to one or more embodiments.
Figure 13B:
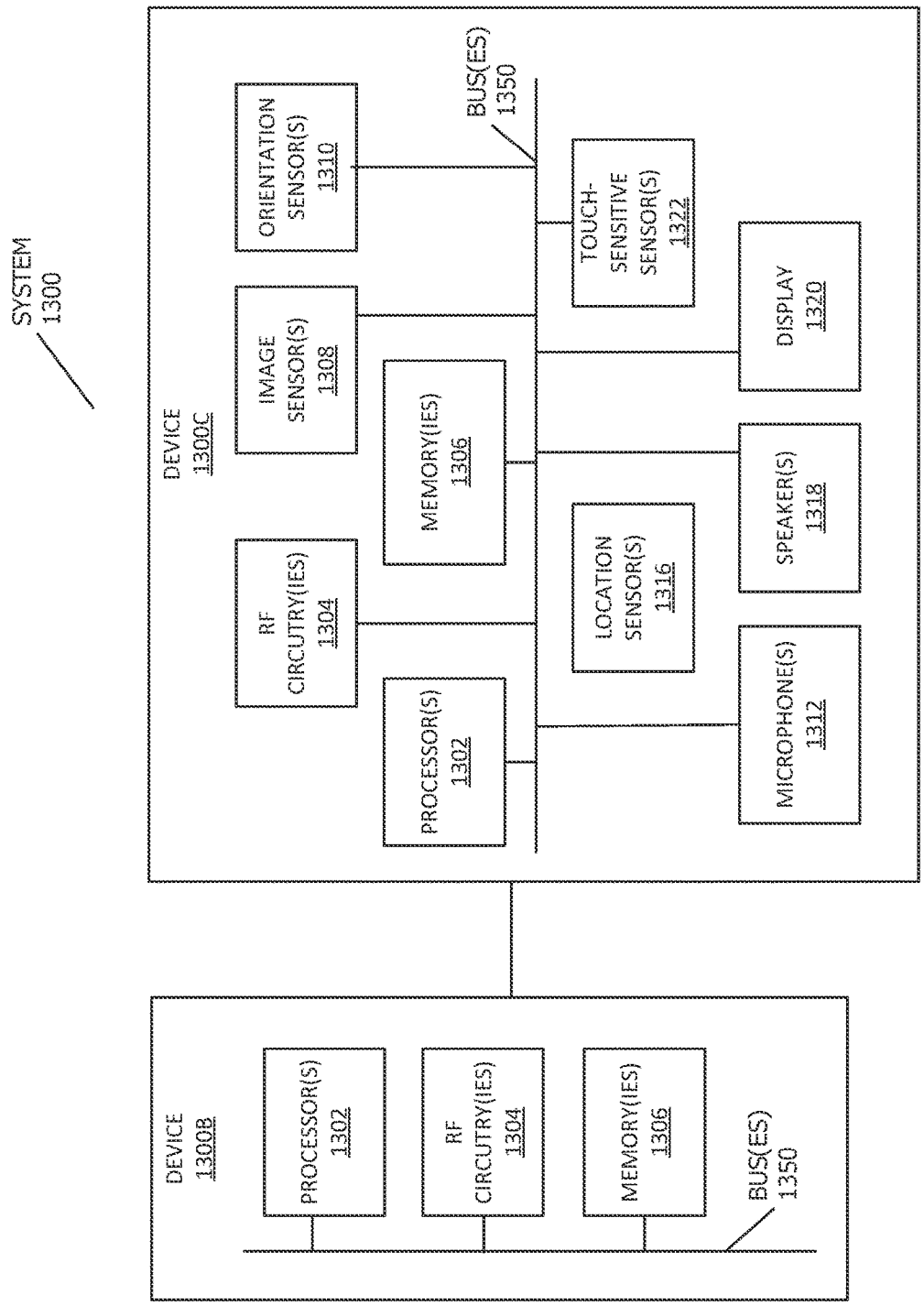

FIG. 13A and FIG. 13B depict exemplary system 1300 for use in various extended reality technologies.

In some examples, as illustrated in FIG. 13A, system 1300 includes device 1300A. Device 1300A includes various components, such as processor(s) 1302, RF circuitry(ies) 1304, memory(ies) 1306, image sensor(s) 1308, orientation sensor(s) 1310, microphone(s) 1312, location sensor(s) 1316, speaker(s) 1318, display(s) 1320, and touch-sensitive surface(s) 1322. These components optionally communicate over communication bus(es) 1350 of device 1300A.

In some examples, elements of system 1300 are implemented in a base station device (e.g., a computing device, such as a remote server, mobile device, or laptop) and other elements of system 1300 are implemented in a second device (e.g., a head-mounted device). In some examples, device 1300A is implemented in a base station device or a second device.

As illustrated in FIG. 13B, in some examples, system 1300 includes two (or more) devices in communication, such as through a wired connection or a wireless connection. First device 1300B (e.g., a base station device) includes processor(s) 1302, RF circuitry(ies) 1304, and memory(ies) 1306. These components optionally communicate over communication bus(es) 1350 of device 1300B. Second device 1300C (e.g., a head-mounted device) includes various components, such as processor(s) 1302, RF circuitry(ies) 1304, memory(ies) 1306, image sensor(s) 1308, orientation sensor(s) 1310, microphone(s) 1312, location sensor(s) 1316, speaker(s) 1318, display(s) 1320, and touch-sensitive surface(s) 1322. These components optionally communicate over communication bus(es) 1350 of device 1300C.

System 1300 includes processor(s) 1302 and memory(ies) 1306. Processor(s) 1302 include one or more general processors, one or more graphics processors, and/or one or more digital signal processors. In some examples, memory(ies) 1306 are one or more non-transitory computer-readable storage mediums (e.g., flash memory, random access memory) that store computer-readable instructions configured to be executed by processor(s) 1302 to perform the techniques described below.

System 1300 includes RF circuitry(ies) 1304. RF circuitry(ies) 1304 optionally include circuitry for communicating with electronic devices, networks, such as the Internet, intranets, and/or a wireless network, such as cellular networks and wireless local area networks (LANs). RF circuitry(ies) 1304 optionally includes circuitry for communicating using near-field communication and/or short-range communication, such as Bluetooth®.

System 1300 includes display(s) 1320. Display(s) 1320 may have an opaque display. Display(s) 1320 may have a transparent or semi-transparent display that may incorporate a substrate through which light representative of images is directed to an individual's eyes. Display(s) 1320 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 1320 include heads up displays, automotive windshields with the ability to display graphics, windows with the ability to display graphics, lenses with the ability to display graphics, tablets, smartphones, and desktop or laptop computers. Alternatively, system 1300 may be designed to receive an external display (e.g., a smartphone). In some examples, system 1300 is a projection-based system that uses retinal projection to project images onto an individual's retina or projects virtual objects into a physical setting (e.g., onto a physical surface or as a holograph).

In some examples, system 1300 includes touch-sensitive surface(s) 1322 for receiving user inputs, such as tap inputs and swipe inputs. In some examples, display(s) 1320 and touch-sensitive surface(s) 1322 form touch-sensitive display(s).

System 1300 includes image sensor(s) 1308. Image sensors(s) 1308 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 1308 also optionally include one or more event camera(s) configured to capture movement of physical elements in the physical setting. Image sensor(s) 1308 also optionally include one or more depth sensor(s) configured to detect the distance of physical elements from system 1300. In some examples, system 1300 uses CCD sensors, event cameras, and depth sensors in combination to detect the physical setting around system 1300. In some examples, image sensor(s) 1308 include a first image sensor and a second image sensor. The first image sensor and the second image sensor are optionally configured to capture images of physical elements in the physical setting from two distinct perspectives. In some examples, system 1300 uses image sensor(s) 1308 to receive user inputs, such as hand gestures. In some examples, system 1300 uses image sensor(s) 1308 to detect the position and orientation of system 1300 and/or display(s) 1320 in the physical setting. For example, system 1300 uses image sensor(s) 1308 to track the position and orientation of display(s) 1320 relative to one or more fixed elements in the physical setting.

In some examples, system 1300 includes microphones(s) 1312. System 1300 uses microphone(s) 1312 to detect sound from the user and/or the physical setting of the user. In some examples, microphone(s) 1312 includes an array of microphones (including a plurality of microphones) that optionally operate in tandem, such as to identify ambient noise or to locate the source of sound in space of the physical setting.

System 1300 includes orientation sensor(s) 1310 for detecting orientation and/or movement of system 1300 and/or display(s) 1320. For example, system 1300 uses orientation sensor(s) 1310 to track changes in the position and/or orientation of system 1300 and/or display(s) 1320, such as with respect to physical elements in the physical setting. Orientation sensor(s) 1310 optionally include one or more gyroscopes and/or one or more accelerometers.

Figure 14:
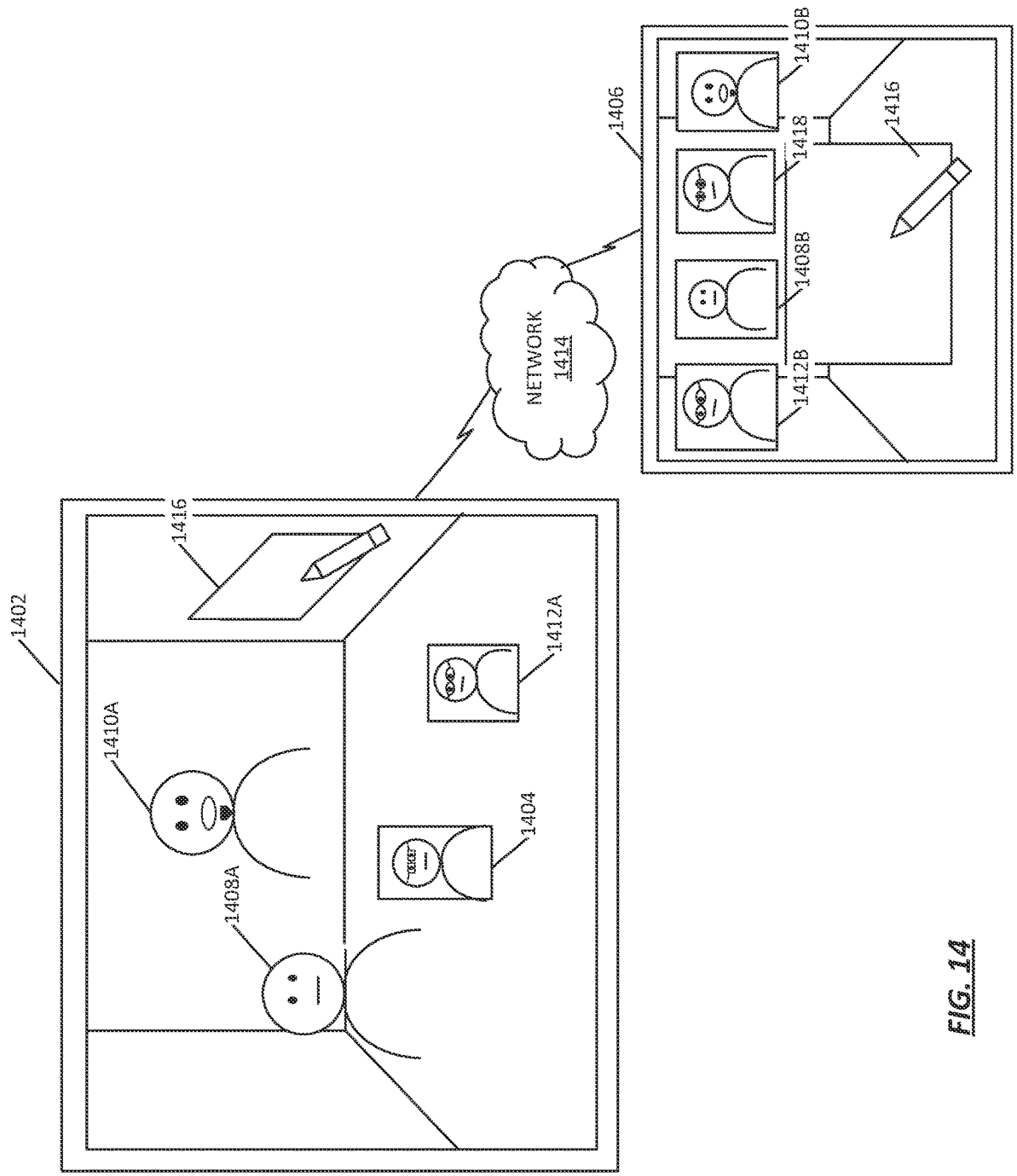
FIG. 14 shows, in block diagram form, a technique for presenting representations of remote users in a multiuser communication session, in accordance with one or more embodiments.

FIG. 14 depicts an example diagram of techniques for presenting representations of remote users in a multiuser communication session, in accordance with one or more embodiments. As shown, device 1402 depicts a room scale representation of the multiuser communication session. Device 1402 displays, in this example, an avatar tile 1404 of a first user of device 1406, along with an avatar 1408A of a second user, an avatar 1410A of a third user, and an avatar tile 1412A of a fourth user. Device 1406 is coupled to device 1402 via network 1414.

The multiuser communication session includes a virtual object, here a virtual writing panel 1416, which may be manipulated by the users of the multiuser communication session. In some cases, the avatar tiles 1404 and 1412A of users may also appear as virtual objects. As described above, the location of the presentation of the virtual object may be determined based on a predetermined location on the display, a predetermined location in the multiuser communication session, a user directed location, and the like. For example, in the room scale representation of the multiuser communication session, such as displayed by device 1402, the avatar tiles 1404 and 1412A of users may be individually moved around and/or rearranged, for example, by users appearing as avatars 1408A and 1410A, or a user of a device, such as the fifth user (e.g., user of device 1402). As another example, the avatar tiles 1404 and 1412A representing users may not be individually positioned and may instead be anchored to a particular portion of the room scale representation of the multiuser communication session. Thus, the avatar tiles 1404 and 1412A may be located relative to the multiuser communication session or a view into the multiuser communication session.

In some examples, only users of a device depicting a room scale representation may be allowed to share a virtual object within the multiuser communication session. For example, only users of a device operating in a room scale mode may be allowed to share an application or media content within the communication session that can be viewed or interacted with by other users. In other examples, users of a device operating in any mode may be allowed to share a virtual object within the multiuser communication session.

In some cases, the avatar tiles 1404 and 1412A may be presented as a two-dimensional representation of users and may depict real-time actions of the corresponding user, including pose, gesture, and the like, without changing location on the display and/or within the multiuser communication session. In some examples, an avatar tile representing a user of a device having a sensor that captures a complete view of the user's body or face may include a 2D video stream of the user. In other examples, an avatar tile representing a user of a device that does not have a sensor that captures a complete view of the user's body or face may include a 2D rendering of a 3D avatar that may or may not depict real-time actions of the user (e.g., based on sensor data representing a partial view of the user). In some cases, users may be represented as either an avatar or an avatar tile and may, in some cases, transition between being represented as an avatar or by an avatar tile, or vice versa. In some cases, whether a user is represented as an avatar or by an avatar tile may be based on a variety of factors, including, but not limited to device capabilities, available processing power, available battery power, available network bandwidth, network connection reliability, and the like. As a first example, in some cases an avatar representation may depict real-time actions corresponding to pose or spatial location information about the user provided by a remote device to a local device, while an avatar tile may not depict real-time actions corresponding to pose or spatial location information. Some devices, such as device 1406, may not be able to provide such information used for the avatar representation and therefore users of such devices, such as the first user of device 1406 may be represented using an avatar tile, such as avatar tile 1404, by other devices, such as device 1402, displaying the multiuser communication session.

As a second example, in some cases, a device, such as device 1402, may limit a number of avatar representations that may be displayed concurrently. As discussed above, in some cases, the avatar representation of a user may include information that may not be included in the avatar tiles. This information may be used, for example, by a local device, such as device 1402, to render and/or display the avatar, such as avatar 1408A and 1410A. Thus, there may be an additional processing and/or network bandwidth overhead for rendering the avatar of a user, as compared to an avatar tile for the user. This additional processing and/or network bandwidth may make it sub-optimal for the local device, such as device 1402, to render and/or display more than a certain number of avatars. In such cases, a number of avatars depicted in the multiuser communication session may be limited. In some cases, whether a user is depicted as an avatar or an avatar tile may be based on one or more conditions. For example, a first (or last) number of users entering the multiuser communication session may be displayed as an avatar, users may select whether to display themselves as an avatar up to a limit, users may vote on which users to display as an avatar, a most active or speaking user may be displayed as an avatar, etc. In some cases, a user may be notified that they are being displayed in an avatar tile and again when being displayed as an avatar. In some cases, a confirmation may be received from the user before they are displayed as an avatar when transitioning between the avatar tile and avatar. In some cases, animations and/or other visual effects may be used to notify other users when a user transitions to an avatar from an avatar tile, or vice versa. For example, the avatar tile may be moved to a relative location in the multiuser communication session associated with where the avatar may be rendered and then an animation displayed and the avatar tile replaced with the avatar.

In some cases, the avatar tiles may be rendered by a remote device, such as device 1406, and then streamed to other devices, for example as a video stream. As an example, the remote device may capture image and/or other data (e.g., point cloud, lidar, radar, etc.) describing the user of the remote device and/or motions of the user, and use this image data and/or other data to render a representation of the user. This representation of the user is separate from any captured image or video of the user. For example, the image data and/or other data may be used to animate a generated representation of the user, such as by representing the user as a talking tree or animal. This rendering may be converted to a data stream, such as a video stream, and streamed to other devices participating in the multiuser communication session. Streaming the rendered representations for the avatar tiles may also help reduce processing and network bandwidth overhead for the local device, as compared to receiving and rendering the avatars.

Device 1406 depicts a stationary version of the multiuser communication session. In some cases, the stationary version of the multiuser communication session may display all users as avatar tiles. Thus, while displayed as avatars on some devices participating in the multiuser communication session (e.g., device 1402), the second user and third user are both displayed as an avatar tiles 1408B and 1410B, respectively, by device 1406. The fourth user is also displayed as an avatar tile 1412B, and the fifth user (of device 1402) is displayed as an avatar tile 1418.

Figure 15:
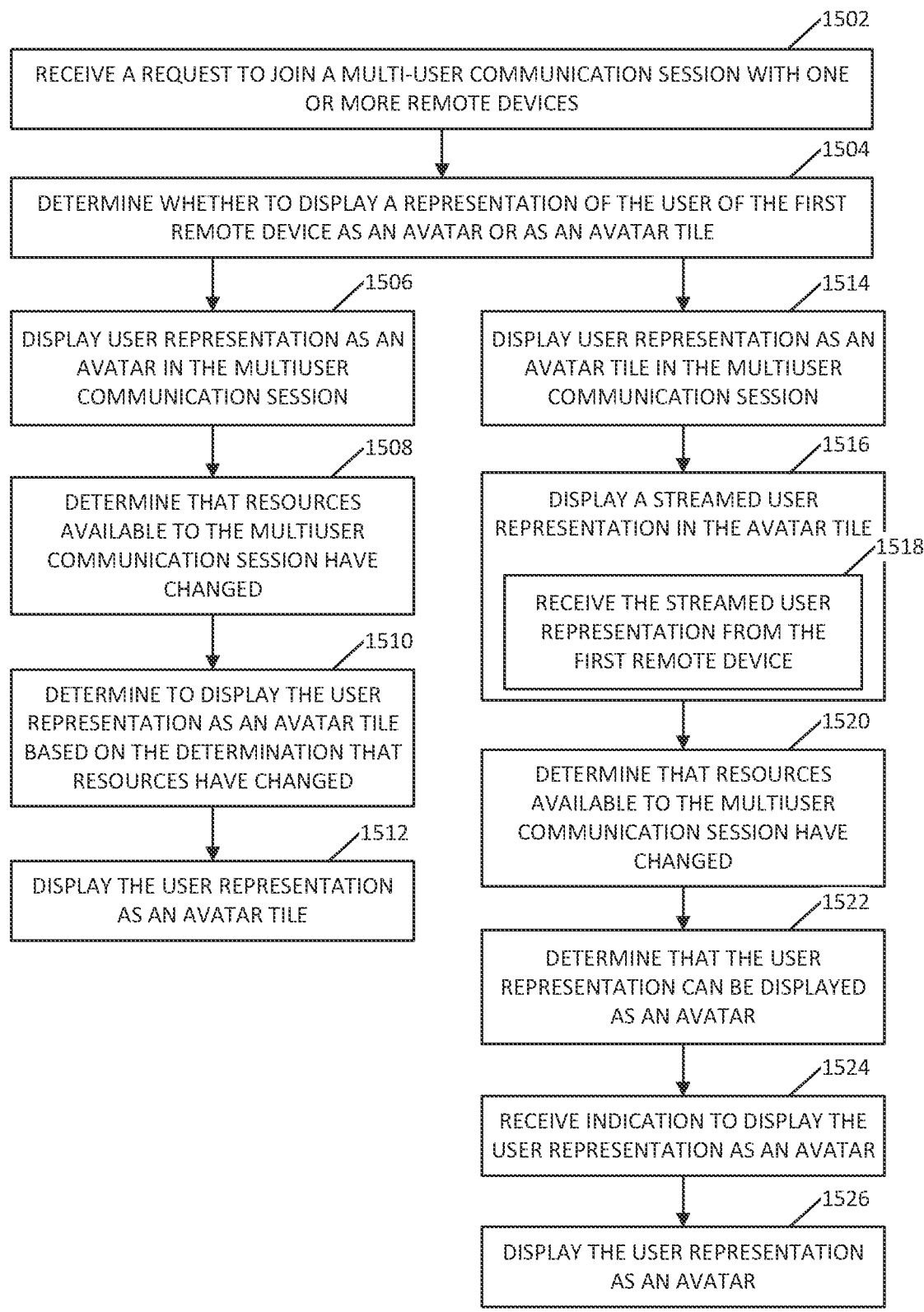
FIG. 15 shows a flowchart of a technique for displaying user representations during an active multiuser communication session, in accordance with aspects of the present disclosure.

FIG. 15 depicts a flowchart of a technique for displaying user representations during an active multiuser communication session, in accordance with aspects of the present disclosure. At block 1502, a request to join a multiuser communication session with a first remote device is received. For example, a local device may request to join an existing multiuser communications session with one or more other devices and receive a response for joining the multiuser communications session. As another example, a local device may request to create a multiuser communication session with one or more other devices and receive a response by the one or more other devices to establish the multiuser communication session.

At block 1504, the local device determines whether to display a user representation of a user of the first remote device as an avatar or as an avatar tile. This determination is based on resources available to the multiuser communication session. The avatar may be a virtual representation of the user and the avatar tile may be a two-dimensional representation of the user. For example, the device may determine what resources are available for the multiuser communication session. This determination may be coordinated with the other devices engaged in the multiuser communication session. The resources available may include at least one of available network bandwidth, available processing power, available battery power, or network connection reliability. For example, where a device is operating on battery power and is below a threshold level of battery power remaining, the device may determine to limit a number of avatars displayed by the device in the multiuser communication session to help conserve battery. Similarly, when available processing power, network bandwidth, and/or network connection reliability is limited, the device may determine to limit a number of avatars displayed by the device. In some cases, multiple thresholds may be defined corresponding to different numbers of avatars that may be displayed and the multiple thresholds. If displaying an avatar of another user would exceed the threshold number of avatars to display, the device may determine to display an avatar tile to represent the user. In some cases, where another device is incapable of providing certain information for rendering the avatar, the device may determine that the user may be represented by the avatar tile, or other element depending on what information cannot be provided. In some cases, the device may transmit an indication to the remote device to provide information for the avatar tile view. As another example, where the device has sufficient available resources, the device may determine that the other user may be represented by an avatar.

At block 1506, the user representation is displayed in the multiuser communication session based on the determination to display the user representation of the user of the first remote device as an avatar. For example, the local device may receive avatar information from one or more of the other remote devices. The local device may then render and display the avatar in the multiuser communication session. Optionally, at block 1508, a determination that resources available to the multiuser communication session have changed is made. For example, the device may monitor the resources used to determine whether to display a user representation of a user of the first remote device as an avatar or as an avatar tile for changes. Continuing the example, the device may determine if the availability of a resource changes, such as battery power available changes, the device is plugged in/unplugged, network reliability deteriorates/improves, etc.

Optionally, at block 1510, a determination to display the user representation as an avatar tile is made based on the determination that resources available to the multiuser communication session have changed. For example, if the device determines that the available battery power has changed and further determines that the number of avatars being displayed is above the threshold number of avatars to display given the available battery power, the device may determine that one or more of the user representations should be changed from avatars to avatar tiles. Optionally, at block 1512, the user representation of the user of the first remote device is displayed as an avatar tile. For example, the user representation may be changed from an avatar to an avatar tile. In some cases, a transition animation may be played back during the change. In some cases, the technique may conclude after block 1512. In some cases, the user representation may be changed back from the avatar tile to the avatar in a manner similar to that discussed starting with block 1520.

Returning to block 1514, the user representation is displayed in the multiuser communication session based on the determination to display the user representation of the user of the first remote device as an avatar tile. Optionally, at block 1516, the avatar tile may display a streamed user representation and optionally, at block 1518, the streamed user representation may be received from the first remote device. For example, the local device may receive avatar tile information from one or more of the other remote devices. In some cases, the avatar tile may display a streamed user representation. This streamed user representation may be streamed from the first remote device and received by the local device. For example, the remote device may then render contents of an avatar tile based on captured data about a user, such as images of the user. The rendered contents of the avatar tile may then be streamed to the other devices in the multiuser communication session.

Optionally, at block 1520, a determination that resources available to the multiuser communication session have changed is made. For example, the device may monitor the resources used to determine whether to display a user representation of a user of the first remote device as an avatar or as an avatar tile for changes. Continuing the example, the device may determine if the availability of a resource changes, such as battery power available changes, the device is plugged in/unplugged, network reliability deteriorates/improves, etc.

Optionally, at block 1522, a determination that the user representation can be displayed as an avatar tile made based on the determination that resources available to the multiuser communication session have changed. For example, if the device determines that the device has been plugged in and further determines that the number of avatars being displayed is now below the threshold number of avatars to display when the device is plugged in, the device may determine that one or more of the user representations should be changed from avatar tiles to avatars. Optionally, at block 1524, an indication to display the user representation as an avatar is received. In some cases, a user, such as the user of the remote device, may be notified and/or prompted before their user representation is changed from an avatar tile to an avatar. For example, the local device may transmit a request to display the avatar to the remote device. The remote device may prompt the user. If an indication to display the avatar is received from the user, the remote device may begin transmitting avatar data to the devices participating in the multiuser communication session.

Optionally, at block 1526, the user representation of the user of the first remote device is displayed as an avatar. For example, the user representation may be changed from the avatar tile to an avatar. In some cases, a transition animation may be played back during the change. In some cases, the technique may conclude after block 1526. In some cases, the user representation may be changed back from the avatar to the avatar tile in a manner similar to that discussed starting with block 1508.

In a first example, a method includes presenting, at a local device, a first representation of multiuser communication session comprising a first representation of a virtual object and a representation of a remote user, wherein the local device is active in the multiuser communication session with a remote device; receiving, at the local device, an indication of an orientation of the remote user relative to a second representation of the virtual object in a second representation of the multiuser communication session presented by the remote device, the indication of the orientation received responsive to a change in orientation of the remote user within the second representation of the multiuser communication session; and updating, at the local device, the presentation of the representation of the remote user based on the indication of the orientation of the remote user relative to the second representation of the virtual object, wherein a change in orientation of the updated representation of the remote user is different than the change in orientation of the remote user within the second representation of the multiuser communication session.

In a second example, the first example may include the first representation of the multiuser communication session comprises a first spatial relationship between the first representation of the virtual object and the representation of the remote user, and wherein the second representation of the multiuser communication session comprises a second spatial relationship between the second representation of the virtual object and the remote user, and the method further includes determining a spatial transformation between the first spatial relationship and the second spatial relationship; and determining the change in orientation of the updated representation of the remote user based on the spatial transformation and the indication of the orientation of the remote user relative to the second representation of the virtual object.

In a third example, the first or second examples described above additionally include determining a second orientation of a local user of the local device relative to the first representation of the virtual object, wherein the second orientation is determined in accordance with a determination that a gaze of the local user is directed to the first representation of the virtual object; and transmitting an indication of the second orientation to the remote device.

In a fourth example, determining that the gaze of the local user is directed to the first representation of the virtual object optionally in the third example includes determining a first degree of confidence that the gaze of the local user is directed to the first representation of the virtual object; determining a second degree of confidence that the gaze of the local user is directed to a representation of a second virtual object; and determining that the gaze of the local user is directed to the first representation of the virtual object in response to the first degree of confidence exceeding the second degree of confidence.

In a fifth example, the third example optionally includes receiving gaze tracking data associated with the local user, wherein the gaze of the local user is determined based on the gaze tracking data.

In a sixth example, any of the first through fifth examples described above optionally include receiving gaze tracking data associated with the local user, wherein the second orientation is determined based on the gaze tracking data.

In a seventh example, any of the first through fifth examples described above optionally include includes receiving image data depicting a hand of the local user, wherein the second orientation is determined in accordance with a determination that the hand is performing a predetermined gesture based on the image data.

In some embodiments, a non-transitory computer-readable storage medium storing one or more programs configured to be executed by one or more processors of an electronic device, the one or more programs including instructions for performing the method of any of the first through seventh examples described above.

In some embodiments, an electronic device includes one or more processors and a memory comprising instructions to cause the one or more processors to perform the method described above in the first through seventh examples.

In an eighth example a method includes obtaining, at a local device active in a multiuser communication session, a spatial relationship between a representation of a remote user and a representation of local user in a representation of the multiuser communication session, wherein the remote user is active in the multiuser communication session; presenting, at the local device, the representation of the multiuser communication session, wherein the representation of the remote user is placed within the representation of the multiuser communication session based on the spatial relationship; detecting a movement of the local device; and updating, at the local device, the presentation of the representation of the multiuser communication session to maintain the spatial relationship between the representation of the local user and the representation of the remote user in response to the movement of the local device.

In a ninth example, obtaining the spatial relationship in the eighth example includes determining the spatial relationship based on a number of participants in the multiuser communication session.

In a tenth example, the eighth or ninth examples optionally include obtaining, at the local device, a second spatial relationship between the representation of the local user and a representation of a virtual object; presenting, at the local device, the representation of the virtual object within the representation of the multiuser communication session in accordance with the second spatial relationship; and updating, at the local device, the representation of the multiuser communication session to maintain the second spatial relationship between the representation of the local user and the representation of the virtual object in response to the movement of the local user.

In an eleventh example, the virtual object of the tenth example corresponds to an interactive application associated with the multiuser communication session.

In a twelfth example, the second spatial relationship of the eleventh example is determined based on the interactive application.

In a thirteenth example, spatial relationship in any of the eighth through twelfth examples optionally comprises a distance between the representation of the local user and the representation of the remote user.

In a fourteenth example, the spatial relationship of any of the eighth through thirteenth examples comprises an angle offset from a forward facing direction of the representation of the local user and a direction towards the representation of the remote user.

In a fifteenth example, any of the eighth through fourteenth examples further comprising: receiving an indication of a change in orientation of the remote user; and updating, at the local device, the representation of the multiuser communication session to reflect the received change in orientation of the remote user.

In a sixteenth example, any of the eighth through fourteenth examples further comprising receiving an indication of a change in location of the representation of the remote user; and maintaining, at the local device, the representation of the multiuser communication session to maintain the spatial relationship.

In a seventeenth example, a second remote user of any of the eighth through sixteenth examples is active in the multiuser communication session, and the method further comprises: presenting, at the local device, a representation of the multiuser communication session comprising a representation of the second remote user in accordance with a second spatial relationship between the representation of the local user and the representation of the second remote user; detecting a second movement of the local device; and updating, at the local device, the presentation of the representation of the multiuser communication session to maintain the spatial relationship between the representation of the local user and the representation of the remote user and the second spatial relationship between the representation of the local user and the representation of the second remote user in response to the second movement of the local device.

In an eighteenth example, the seventeenth example further comprises receiving an indication of a change in orientation of the second remote user; and updating, at the local device, the representation of the multiuser communication session to reflect the change in orientation of the second remote user.

In a nineteenth example, the method of the eighteenth example further comprises receiving an indication of a change in location of the second user; and maintaining, at the local device, the representation of the multiuser communication session to maintain the second spatial relationship.

In some embodiments, a non-transitory computer-readable storage medium storing one or more programs configured to be executed by one or more processors of an electronic device, the one or more programs including instructions for performing the method of any of the eighth through nineteenth examples described above.

In some embodiments, an electronic device includes one or more processors and a memory comprising instructions to cause the one or more processors to perform the method described above in the eighth through nineteenth examples.

In a twentieth example, a method comprises receiving, at a local device, a request to join a multiuser communication session with a first remote device; receiving an input at the local device to select a first display preference from a plurality of display preferences, wherein the plurality of display preferences comprise a stationary mode and a room scale mode, wherein the stationary mode presents a representation of the multiuser communication session in a device-specific configuration, and wherein the room scale mode presents the representation of the multiuser communication session in a consistent configuration with other devices in the multiuser communication session using the room scale mode; in accordance with the selection of the stationary mode, presenting at the local device, a first representation of the multiuser communication session in accordance with the stationary mode such that virtual components of the multiuser communication session are presented within a predetermined proximity of a representation of a user of the local device.

In a twenty-first example, the first representation of the multiuser communication session of the twentieth example comprises a representation of a first remote user of the first remote device in a stationary location.

In a twenty-second example, the method of any of the twentieth or twenty-first examples further comprises receiving an updated display preference comprising the room scale mode; and in accordance with the updated display preference, presenting, at the first device, the first representation of the multiuser communication session in accordance with the room scale mode and a first remote display preference associated with the first remote device.

In a twenty-third example, the method of the twenty-second example further comprises presenting, in accordance with the updated display preference, a visual transition between the stationary mode of the first representation of the multiuser communication session and the room scale mode of the first representation of the multiuser communication session.

In a twenty-fourth example, the first remote display preference of the twentieth to twenty-third example comprises the room scale mode, and the first representation of the multiuser communication session presents components of the multiuser communication session in a consistent configuration with a second representation of the multiuser communication session presented by the first remote device.

In a twenty-fifth example, the first remote display preference of the twentieth to twenty-third example comprises the stationary mode, and the first representation of the multiuser communication session comprises a representation of a first remote user of the first remote device in a stationary location.

In a twenty-sixth example, the device-specific configuration of any of the twentieth to twenty-fifth examples comprises a local relative presentation of elements within the multiuser communication session for the local device that differs from a relative presentation of the elements within a remote representation of the multiuser communication session at one or more of the other devices.

In a twenty-seventh example, the consistent configuration the method of any of the twentieth to twenty-sixth example comprises a local relative presentation of elements within the multiuser communication session for the local device that is consistent with a relative presentation of the elements within a remote representation of the multiuser communication session at one or more of the other devices.

In some embodiments, a non-transitory computer-readable storage medium storing one or more programs configured to be executed by one or more processors of an electronic device, the one or more programs including instructions for performing the method of any of the twentieth to twenty-seventh examples described above.

In some embodiments, an electronic device includes one or more processors and a memory comprising instructions to cause the one or more processors to perform the method described above in the twentieth to twenty-seventh examples.

The techniques defined herein consider the option of obtaining and utilizing a user's personal information. For example, such personal information may be utilized in order to provide a multi-user communication session on an electronic device. However, to the extent such personal information is collected, such information should be obtained with the user's informed consent, such that the user has knowledge of and control over the use of their personal information.

Parties having access to personal information will utilize the information only for legitimate and reasonable purposes, and will adhere to privacy policies and practices that are at least in accordance with appropriate laws and regulations. In addition, such policies are to be well-established, user-accessible, and recognized as meeting or exceeding governmental/industry standards. Moreover, the personal information will not be distributed, sold, or otherwise shared outside of any reasonable and legitimate purposes.

Users may, however, limit the degree to which such parties may obtain personal information. The processes and devices described herein may allow settings or other preferences to be altered such that users control access of their personal information. Furthermore, while some features defined herein are described in the context of using personal information, various aspects of these features can be implemented without the need to use such information. As an example, a user's person information may be obscured or otherwise generalized such that the information does not identify the specific user from which the information was obtained.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 4-5, 7-8, 10-11, and 15 or the arrangement of elements shown in FIGS. 1-3, 6, 9, 12, and 14 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer-readable medium comprising computer-readable code executable by one or more processors to: receive, at a local dex ice, a request to join a multiuser communication session with a first remote device; receive an input at the local dex ice to select a first display preference from a plurality of display preferences, wherein the plurality of display preferences comprise a stationary mode and a room scale mode wherein the stationary mode presents a representation of the multiuser communication session in a device-specific configuration and wherein the room scale mode presents the representation of the multiuser communication session in a consistent configuration with other devices in the multiuser communication session using the room scale mode; and in response to receiving a selection of the room scale mode, present at the local device a first representation of the multiuser communication session in accordance with the room scale mode and a first remote display preference associated with the first remote device.

2. The non-transitory computer-readable medium of claim 1, further comprising computer-readable code to: receive an updated selection for the first display preference, wherein the updated selection comprises the stationary mode: and in accordance with the selection of the stationary mode, update the first representation of the multiuser communication session in accordance vith the stationary mode such that virtual components of the multiuser communication session are presented within a predetermined proximity of a representation of the user.

3. The non-transitory computer-readable medium of claim 2, wherein the updated first representation of the multiuser communication session comprises a stationary representation of a first remote user of the first remote device.

4. The non-transitory computer-readable medium claim 1: wherein the first remote display preference comprises the room scale mode, and wherein the first representation of the multiuser communication session presents components of the multiuser communication session in a consistent configuration with a second representation of the multiuser communication session presented by the first remote device.

5. The non-transitory computer-readable medium of claim 4, wherein a second remote user of a second remote device is active in the multiuser communication session, and wherein the first representation of the multiuser communication session comprises a representation of the second remote user of the second remote device in a stationary location, wherein the stationary location is consistent in the first representation of the multiuser communication session and the second representation of the multiuser communication session.

6. The non-transitory computer-readable medium of claim 5, further comprising computer-readable code to: receive, by the local device, user input to move the representation of the second remote user to an updated location; and transmit an indication of the updated location to the first remote device such that the updated location of the representation of the second remote user to be presented consistently in the local device and the first remote device in accordance with the room scale mode of the local device and the first remote device.

7. The non-transitory computer-readable medium of claim 1: wherein the first remote display preference comprises the stationary mode, and wherein the first representation of the multiuser communication session comprises a representation of a first remote user of the first remote device in a stationary location.

8. The non-transitory computer-readable medium of claim 7, wherein a second remote user of a second remote device is active in the multiuser communication session, and further comprising computer-readable code to: receive an indication that the first remote user has updated the first remote display preference to the room scale mode; and update the first representation of the multiuser communication session to present components of the multiuser communication session in a consistent configuration with a second representation of the multiuser communication session presented by the first remote device, and a third representation of the multiuser communication session presented by the second remote device.

9. The non-transitory computer-readable medium of claim 8, wherein the computer-readable code to update the first representation comprises computer-readable code to cause a representation of the second remote user to move in accordance with movements of the second remote user.

10. The non-transitory computer readable medium of claim 1, wherein the device-specific configuration comprises a local relative presentation of elements within the multiuser communication session for the local device that differs from a relative presentation of the elements within a remote representation of the multiuser communication session at one or more of the other devices.

11. The non-transitory computer readable medium of claim 1, wherein the consistent configuration comprises a local relative presentation of elements within the multiuser communication session for the local device that is consistent with a relative presentation of the elements within a remote representation of the multiuser communication session at one or more of the other devices.

12. A system comprising:
one or more processors; and
one or more computer-readable media comprising computer-readable code executable by the one or more processors to:
receive, at a local device, a request to join a multiuser communication session with a first remote device;
receive an input at the local device to select a first display preference from a plurality of display preferences, wherein the plurality of display preferences comprise a stationary mode and a room scale mode,
wherein the stationary mode presents a representation of the multiuser communication session in a device-specific configuration, and
wherein the room scale mode presents the representation of the multiuser communication session in a consistent configuration with other devices in the multiuser communication session using the room scale mode;
in response to receiving a selection of the room scale mode, present, at the first remote device, a first representation of the multiuser communication session in accordance with the room scale mode and a first remote display preference associated with the first remote device.

13. The system of claim 12, further comprising computer-readable code to: receive an updated selection for the first display preference, wherein the updated selection comprises the stationary mode; and in accordance with the selection of the stationary mode, update the first representation of the multiuser communication session in accordance with the stationary mode such that virtual components of the multiuser communication session are presented within a predetermined proximity of a representation of the user.

14. The system of claim 12: wherein the first remote display preference comprises the room scale mode, and wherein the first representation of the multiuser communication session presents components of the multiuser communication session in a consistent configuration with a second representation of the multiuser communication session presented by the first remote device.

15. The system of claim 14, wherein a second remote user is active in the multiuser communication session, wherein the first representation of the multiuser communication session comprises a representation of the second remote user of the first remote device in a stationary location, wherein the stationary location is consistent in the first representation of the multiuser communication session and the second representation of the multiuser communication session, and further comprising computer-readable code to: receive, by the local device, user input to move the representation of the second remote user to an updated location; and transmit an indication of the updated location to the first remote device such that the updated location of the representation of the second remote user to be presented consistently in the local device and the first remote device in accordance with the room scale mode of the local device and the first remote device.

16. The system of claim 12: wherein the first remote display preference comprises the stationary mode, and wherein the first representation of the multiuser communication session comprises a representation of a first remote user of the first remote device in a stationary location, and wherein a second remote user is active in the multiuser communication session, and further comprising computer-readable code to: receive an indication that the first remote user has updated the first remote display preference to the room scale mode: and update the first representation of the multiuser communication session to presents components of the multiuser communication session in a consistent configuration with a second representation of the multiuser communication session presented by the first remote device, and a third representation of the multiuser communication session presented by the second remote device.

17. The system of claim 12, wherein the device-specific configuration comprises a local relative presentation of elements within the multiuser communication session for the local device that differs from a relative presentation of the elements within a remote representation of the multiuser communication session at one or more of the other devices.

18. The system of claim 12, wherein the consistent configuration comprises a local relative presentation of elements within the multiuser communication session for the local device that is consistent with a relative presentation of the elements within a remote representation of the multiuser communication session at one or more of the other devices.

19. A method comprising: receiving, at a local device, a request to join a multiuser communication session with a first remote device; receiving an input at the local device to select a first display preference from a plurality of display preferences, wherein the plurality of display preferences comprise a stationary mode and a room scale mode, wherein the stationary mode presents a representation of the multiuser communication session in a device-specific configuration, and wherein the room scale mode presents the representation of the multiuser communication session in a consistent configuration with other devices in the multiuser communication session using the room scale mode; in response to receiving a selection of the room scale mode, presenting, at the first remote device, a first representation of the multiuser communication session in accordance with the room scale mode and a first remote display preference associated with the first remote device.

20. The method of claim 19, further comprising: receiving an updated selection for the first display preference, wherein the updated selection comprises the stationary mode; and in accordance with the selection of the stationary mode, updating the first representation of the multiuser communication session in accordance with the stationary mode such that virtual components of the multiuser communication session are presented within a predetermined proximity of a representation of a user.

* * * * *

UNITED STATES PATENT AND TRADEMARK OFFICE
CERTIFICATE OF CORRECTION

PATENT NO. : 11,968,056 B2  
APPLICATION NO. : 18/189017  
DATED : April 23, 2024  
INVENTOR(S) : Connor A. Smith et al.

It is certified that error appears in the above-identified patent and that said Letters Patent is hereby corrected as shown below:

In the Claims

Column 33 Line 16: replace the phrase "dex ice" with the word --device--;

Column 33 Line 18: replace the phrase "dex ice" with the word --device--;

Column 33 Line 35: replace the phrase "the stationary mode: and" with the phrase --the stationary mode; and--;

Column 33 Line 38: replace the phrase "in accordance vith" with the phrase --in accordance with--.

Signed and Sealed this  
Twenty-first Day of May, 2024

Katherine Kelly Vidal  
*Director of the United States Patent and Trademark Office*